United States Patent
Rao et al.

(10) Patent No.: US 11,392,844 B1
(45) Date of Patent: Jul. 19, 2022

(54) CUSTOMIZABLE SERVICE FOR RECOMMENDATIONS ON SOURCE CODE QUALITY

(71) Applicant: Amazon Technologies, Inc., Seattle, WA (US)

(72) Inventors: Srinivasan Sengamedu Hanumantha Rao, Seattle, WA (US); Omer Tripp, San Jose, CA (US); Hoan Nguyen, Bothell, WA (US); Alok Dhamanaskar, Seattle, WA (US); Hakimuddin Hanif, Sammamish, WA (US); Shishir Sethiya, Seattle, WA (US); Xiaoxin Zhao, Seattle, WA (US); Pranav Garg, Jersey City, NJ (US); Sahil Sareen, Seattle, WA (US); Himani Khanduja, Seattle, WA (US); Harshit Gupta, Seattle, WA (US); Jasmeet Chhabra, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 16/836,382

(22) Filed: Mar. 31, 2020

(51) Int. Cl.
  *G06N 5/04* (2006.01)
  *H04L 67/60* (2022.01)
  *G06N 20/00* (2019.01)

(52) U.S. Cl.
  CPC .............. *G06N 5/04* (2013.01); *G06N 20/00* (2019.01); *H04L 67/32* (2013.01)

(58) Field of Classification Search
  CPC .... G06F 8/76; G06F 8/72; G06N 5/04; G06N 20/00; H04L 67/10; H04L 67/34
  USPC .................................................. 717/120–167
  See application file for complete search history.

(56) References Cited

U.S. PATENT DOCUMENTS

| | | | |
|---|---|---|---|
| 9,269,095 B1* | 2/2016 | Chan ..................... | G06F 16/248 |
| 2007/0261047 A1* | 11/2007 | Sah .......................... | G06F 8/65 |
| | | | 717/140 |
| 2010/0269087 A1* | 10/2010 | Kabra .................... | G06Q 10/06 |
| | | | 717/101 |
| 2015/0082277 A1* | 3/2015 | Champlin-Scharff .... | G06F 8/70 |
| | | | 717/120 |

(Continued)

OTHER PUBLICATIONS

De Stefano, Manuel, et al. "Refactoring Recommendations Based on the Optimization of Socio-Technical Congruence." 2020 IEEE International Conference on Software Maintenance and Evolution (ICSME). IEEE, 2020.pp. 794-796 (Year: 2020).*

(Continued)

*Primary Examiner* — Satish Rampuria
(74) *Attorney, Agent, or Firm* — Nicholson De Vos Webster & Elliott LLP

(57) ABSTRACT

Techniques for a code reviewer service to provide recommendations on source code are described. A code reviewer service may run rules and/or machine learning models to provide the recommendations. A machine learning model may identify one or more predicted issues of source code, and the code reviewer service may provide one or more recommendations based at least in part on the one or more predicted issues. Code reviewer service may allow a pull request for a code repository to trigger the generation of recommendations for the source code in the repository. The recommendations may be posted on the pull request.

18 Claims, 17 Drawing Sheets

(56) References Cited

U.S. PATENT DOCUMENTS

| | | | | |
|---|---|---|---|---|
| 2017/0034023 | A1* | 2/2017 | Nickolov | H04L 43/0817 |
| 2019/0228319 | A1* | 7/2019 | Gupta | G06N 5/04 |
| 2021/0279577 | A1* | 9/2021 | West | G06N 3/0445 |

OTHER PUBLICATIONS

Rahman, Mohammad Masudur, et al. "Correct: Code reviewer recommendation at github for vendasta technologies." Proceedings of the 31st IEEE/ACM International Conference on Automated Software Engineering. 2016.pp. 792-797 (Year: 2016).*

Trümper, Jonas, and Jürgen Döllner. "Extending recommendation systems with software maps." 2012 Third International Workshop on Recommendation Systems for Software Engineering (RSSE). IEEE, 2012.pp. 92-96 (Year: 2012).*

O'cathain, Alicia, Elizabeth Murphy, and Jon Nicholl. "The quality of mixed methods studies in health services research." Journal of health services research & policy 13.2 (2008): pp. 92-98. (Year: 2008).*

Ethiraj, Sendil K., et al. "Where do capabilities come from and how do they matter? A study in the software services industry." Strategic management journal 26.1 (2005): pp. 25-45. (Year: 2005).*

Mancoridis, Spiros, et al. "Using automatic clustering to produce high-level system organizations of source code." Proceedings. 6th International Workshop on Program Comprehension. IWPC'98 (Cat. No. 98TB100242). IEEE, 1998.pp. 1-8 (Year: 1998).*

* cited by examiner

FIG. 11

CUSTOMIZABLE SERVICE FOR RECOMMENDATIONS ON SOURCE CODE QUALITY

BACKGROUND

More and more companies are now incorporating computers and software services into many facets of their business. These companies are using software to provide more and more complex services. The complexity of these services has, in turn, increased the functionality required from the software that provides these services. Thus, software projects have become more complex and software development of large applications is typically a lengthy process, requiring multiple developers many months to complete development. The increased complexity in the software development process has made the task of administering and managing software challenging.

BRIEF DESCRIPTION OF DRAWINGS

Various embodiments in accordance with the present disclosure will be described with reference to the drawings, in which:

FIG. 11 is a diagram illustrating an exemplary graphical user interface of recommendations sent to a user for a request to perform a review of source code in the code repository according to some embodiments.

DETAILED DESCRIPTION

Figure 1:
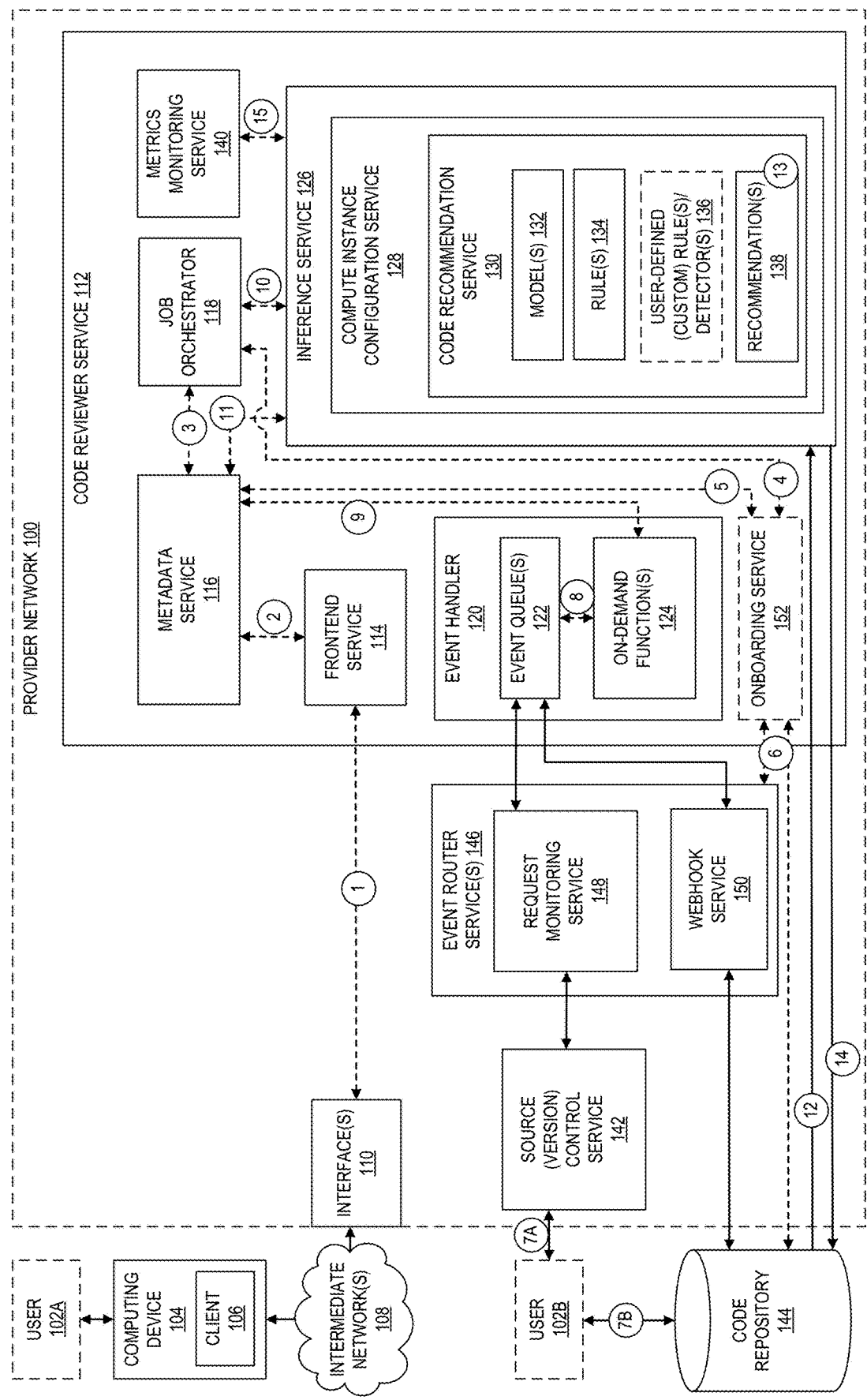
FIG. 1 is a diagram illustrating an environment for a code reviewer service according to some embodiments.

The present disclosure relates to methods, apparatus, systems, and non-transitory computer-readable storage media for a customizable code reviewer service to generate recommendations to improve code quality. According to some embodiments, a customizable code reviewer service is disclosed that upon a user's request can quickly and accurately identify one or more predicted issues of source code and provide respective recommendation(s) to alleviate the predicted issues. In certain embodiment, a code reviewer service disclosed herein helps users (e.g., developers) to write high quality (e.g., source) code and increases their productivity by providing recommendations during code reviews. Ensuring code quality is one of the most pressing problems faced by the software industry today. Lack of reliability and maintainability in production code can cause defects ranging from minor usability problems to causing an application to be unavailable for an extended period of time. Inconsistent coding practices and readability issues further delay remediation. Certain embodiments herein avoid only using manual code review and/or static analyzers, as they are cost-prohibitive and inefficient. For example, with a manual code reviews, code changes are typically reviewed by peers (e.g., humans). The iterative interaction required for peer code reviews delays code approval, often by days. As a result, organizations may either spend a large portion of development time on these activities or skip this step due to lack of expert reviewers or time constraints. This negatively impacts code quality and pace of innovation. In certain embodiment, a code reviewer service disclosed herein allows a developer (e.g., team(s) thereof) to improve the quality of their code and reduce the manual effort required for code reviews by taking advantage of actionable recommendations generated by the code reviewer service.

In certain embodiments, a code reviewer service runs various rules and machine learning models to provide various recommendations to developers, for example, as comments on pull requests and as on-demand recommendations on their repositories hosted in a code repository. In one embodiment, a user onboards their source code into a repository and the identifying of predicted issues (e.g., and the providing of recommendations to improve code quality) is triggered on (e.g., every) pull request. In one embodiment, a user specifically requests the identifying of predicted issues (e.g., and the providing of recommendations to improve code quality) for a given repository (with or without onboarding). The recommendations may be to improve a particular subset of software code and/or the entire repository. In certain embodiments, a code reviewer service allows a user to provide feedback on the recommendations.

As used herein, the term "code repository" may generally refer to a source code repository that is hosted, for example, by a user or by a repository provider. As used herein, the term "pull request" may generally refer to a request that indicates the changed artifacts that a developer has made to a repository (e.g., branch) and shares that with other developers and services for various purposes (e.g., code review, merge, and/or recommendations). As used herein, the term "inference" may generally refer to the process of running a code recommendation service on a customer's code to generate recommendations. As used herein, "rules" may be a human curated and defined set of rules used to provide recommendations on a code repository. In certain embodiments, rules do not involve any machine learning, for example, but do utilize a dataset to run and validate the rules.

FIG. 1 is a diagram illustrating an environment for a code reviewer service according to some embodiments. In this exemplary environment, a code reviewer service 112 includes a frontend service 114, a metadata service 116, a job orchestrator 118, an event handler 120, and an inference service 126. Code reviewer service 112 may include a metrics monitoring service 140 and/or an onboarding service 152. In certain embodiments, code reviewer service 112 receives a request to perform a review of source code, and uses the services and/or workflow systems therein to generate one or more recommendations 138.

In certain embodiments, frontend service 114 is the service that a customer uses (e.g., calls directly) via application programming interface (API) calls, via a console implemented as a website or application, etc. In one embodiment, this is the entry point for all the API calls that support onboarding and an on-demand inference for code review. In one embodiment, frontend service 114 is a (e.g., public facing) gateway that internally calls metadata service 116, and the metadata service 116 implements the different internal calls to the various components for the API calls. In one embodiment, frontend service 114 converts the user API calls to internal API calls of code reviewer service 112. An API may generally refer to an interface and/or communication protocol between a client and a server, such that if the client makes a request in a predefined format, the client should receive a response in a specific format or initiate a defined action. In a cloud provider network context, APIs can provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In certain embodiments, metadata service 116 is an (e.g., internal to code reviewer service 112 and not exposed to the user) control plane service that manages and keeps track of repository associations, on-demand recommendations, pull-requests, and/or feedback. In one embodiment, metadata service 116 provides an internal set of API calls that implement user (e.g., public) API calls and are called by frontend service 114. In one embodiment, metadata service 116 provides various internal APIs called by other (e.g., asynchronous) workflows such as onboarding and inference to manage and track related metadata. In certain embodiments, metadata service 116 is the service that manages all the metadata within code reviewer service 112. The term "metadata" may generally refer to data that provides information about other data.

In certain embodiments, job orchestrator 118 (e.g., job sweeper) is to sweep enqueued tasks for onboarding and inference, and trigger corresponding workflows. In one embodiment, the workflows are executed using a workflow service (e.g., workflow service 200 in FIG. 2) (e.g., a workflow service that builds distributed application using visual workflows) which runs various tasks depending on the workflow type.

In certain embodiments, event handler 120 (e.g., event handler service) is responsible for monitoring (e.g., event queue(s) 122) and processing various events such as pull-requests from customer code repositories, feedback on recommendations, etc. In one embodiment, event handler 120 performs validation of an event and then routes the event to its corresponding workflow (e.g., onboarding, inference, etc.) via metadata service 116.

In certain embodiments, onboarding service 152 is responsible for handling onboarding workflows which includes various steps to associate a code repository with code reviewer service 112. In one embodiment, onboarding service 152 sets up resources (webhooks, service linked role (SLR), etc.) used to monitor various events (e.g., pull requests, feedbacks) on a user's (e.g., customer's) repositories. In one embodiment for a pull request, onboarding service 152 checks that code reviewer service 112 (e.g., inference service 126 thereof) can be run and then posts recommendations as comments on the pull request. In one embodiment, onboarding service 152 sets up a pull request notification configuration with code repository 144 and/or a source code access configuration with code repository 144.

In certain embodiments, inference service 126 is responsible for running an inference on code, e.g., either for a pull request or on-demand for a code repository. In one embodiment for pull requests, inference service 126 posts recommendations 138 as comments on the pull request. In one embodiment for an on-demand request, inference service 126 stores the recommendations 138 (e.g., without any source code or source code snippets) which are then served (e.g., provided) via an inference API call.

In certain embodiments, environment in FIG. 1 includes a code repository 144 (e.g. and includes a code repository service to manage the code repository). Code repository 144 may be separate from code reviewer service 112 (e.g. and separate from provider network 100). In one embodiment, code reviewer service 112 is to interact with code repository 144 (e.g., code repository service) to fetch the source code to be reviewed and any metadata to be utilized.

In certain embodiments, provider network 100 includes one or more event router services 146 to route the events happening in code repository 144 (e.g., an event of a pull request, feedback, etc.) to code reviewer service 112. The implementation of an event router service 146 can differ based on the type of code repository providers. For example, for an external code repository, event router service 146 may include a webhook service 150 that is responsible for routing the events into event handler 120 (e.g., event queue 122 thereof) of code reviewer service 112. As another example for an external code repository, event router service 146 may include a request monitoring service 148 with a rule configured to cause detection of an event to be sent to event handler 120 (e.g., event queue 122 thereof) of code reviewer service 112. In one embodiment, an event is an update of source code as indicated by source (e.g., version) control service 142, and request monitoring service 148 sends a corresponding event indication to event handler 120 (e.g., event queue 122 thereof) of code reviewer service 112.

As one example, a customer can configure the code reviewer service 112 to generate one or more recommendations 138 for source code repository 144 by setting up: (1) a pull request inference where a customer can onboard a given repository so that code reviewer service 112 posts code recommendations 138 on every pull request on that repository 144 and/or (2) an on-demand inference where a user's request (e.g., via a Create Recommendation Job API call) triggers an inference on a (e.g., entire) code repository 144 to create recommendations 138.

In certain embodiments, a code repository is onboarded by onboarding service 152 for monitoring by a customer providing a request that includes an identifier of the source code. In one embodiment, the user's request for an on-demand inference results in an asynchronous job with a job identification (ID) that fetches the source code from the repository 144 and performs an inference on the source code. In certain embodiments, once the job finishes, the customer can view code recommendations generated by the job, e.g., in a console or by a request (e.g., via a List Recommendations API call) that includes the job ID.

In certain embodiments, a customer can use an on-demand inference before and/or after onboarding the code repository for monitoring and code reviewing. In one embodiment, when a customer wants to enable recommendations on every pull request on their code repository in a code repository, they are to onboard their code repository by associating their code repository with the code reviewer service. This onboarding may include setting up the desired resources in provider network 100 (e.g., in code reviewer service 112 and/or event router services 146) and a customer's account that enables monitoring of the pull requests on their repository, running inference, and posting recommendations as comments on the pull request.

In one embodiment, onboarding is logically divided into two parts: (1) where a customer associates a particular repository as a repository to be monitored and (2) an onboarding workflow.

In certain embodiments of "(1) where a customer associates a particular repository as a repository to be monitored", a customer performs an associate repository API call. This may include selecting a repository (e.g., via a console) and calling the associate repository API. This may vary depending on the source control service (e.g., system) where the repository is being hosted. For example, when a customer lands on a coder reviewer console, the console may use a console impersonation token to list the one or more repositories accessible by the customer. Once a customer selects a repository, the console may then perform an associate repository API call signed using customer credentials. As another example, when a customer wants to enable code reviewing on its code repositories via a code reviewer console of code reviewer service 112, the customer may perform an authorization handshake (e.g., according to an industry-standard protocol) and provide the code reviewer service 112 an authorization token from the authorization handshake. Code reviewer service 112 may use this token to list the one or more repositories hosted for that user, and once a customer selects a repository, the console may then call (e.g., frontend service 114) associate repository API along with the token identifier (e.g., the identifier for the authorization token stored in the database). In one embodiment for calling an associate repository API, a customer is to create a personal access token (PAT) for the repository and pass it to associate repository API input.

In certain embodiments of "(2) an onboarding workflow", when a customer successfully calls an associate repository API on the frontend service 114, the code reviewer service 112 will enqueue a task with job orchestrator 118. In one embodiment, the job orchestrator 118 will then pick up this task and trigger a workflow for creating/configuring resources in a customer's account. Once the workflow successfully finishes, the repository association status will change to indicate "associated" and the customer onboarding is now successfully completed.

In certain embodiments, the type of resources created/configured by code reviewer service 112 depends on the customer's code repository (e.g., repository provider). In one embodiment, code reviewer service 112 supports a code repository hosted within provider network 100 or a code repository hosted external from provider network 100.

In certain embodiments, code reviewer service 112 supports a code repository that is managed by source (e.g., version) control service 142. Source (e.g., version) control service 142 may be hosted within provider network or external from provider network 100.

In one embodiment where code reviewer service 112 supports a code repository that is managed by source (e.g., version) control service 142, code reviewer service 112 is to create: a service linked role (SLR) where code reviewer service 112 is to use and assume this SLR during inference to clone the code repository, a system tag where code reviewer service's 112 SLR policy would only provide access to repositories with that system tag, and/or a managed rule in request monitoring service 148 to cause an event indication to be sent to event handler 120 (e.g., event queue 122 thereof) when a change (e.g., pull request) for the code repository is detected by request monitoring service 148.

In one embodiment where code reviewer service 112 supports a code repository that is managed separately from provider network 100, code reviewer service 112 is to: cause onboarding service 152 to call the repository's API (e.g., representational state transfer (REST) API) to configure the webhook for the Uniform Resource Locator (URL) of the code repository, create a webhook configuration in webhook service 150 to cause an event indication to be sent to event handler 120 (e.g., event queue 122 thereof) when a change (e.g., pull request and/or pull request comment) for the code repository is detected by webhook service 150.

In certain embodiments, after the onboarding such that all the resources (e.g., webhooks, SLRs etc.) are setup for the given repository of the customer, event handler 120 receives notifications once a pull request is posted on that repository. In one embodiment, the event handler 120 will then fetch the required metadata about the repository from the code repository 144 and then will call create recommendation job API of metadata service 116 to enqueue a job, e.g., with job orchestrator 118. In one embodiments job orchestrator 118 runs an inference task for the job with inference service 126 to generate code recommendations 138 (e.g. and posts the code recommendations 138 on the pull request).

In certain embodiments, a user (e.g., customer) sends an on-demand inference request for a (e.g., entire) code repository (e.g., via an API call to front end service 114) that triggers an inference job on a given code repository. In one embodiment, a user accessible API call (e.g., not limited to being an internally used API call of code reviewer service 112) is sent to the frontend service 114 that in turns calls a create recommendation job API of metadata service 116 to enqueue the job, e.g., with job orchestrator 118. In one embodiment, job orchestrator 118 runs an inference task for the job with inference service 126 to generate code recommendations 138 (e.g. and provide the code recommendations 138 to the user).

Thus, for each job request (e.g., request to perform an inference to generate recommendations on source code from a repository), inference service 126 generates one or more recommendation 138 for the source code from the repository.

In some embodiments, the code reviewer service 112 (and other services shown in FIG. 1) is implemented as a service within a provider network 100. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 108 (e.g., the internet) via one or more interface(s) 110, such as through use of application programming interface (API) calls, via a console implemented as a website or application, etc. The interface(s) 110 may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service (e.g., on demand functions 124 in FIG. 1) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As an example high-level overview, each (e.g., inference) request to perform a review of source code triggers a separate compute instance (e.g., managed by compute instance configuration service 128) that runs code recommendation service 130 on the customer source code and generates recommendations 138. In one embodiment, if the inference is for pull requests, then these recommendations are posted on the pull request as comments. In one embodiment (e.g., when the inference is for an entire code repository), the recommendations 138 are stored (e.g., encrypted) in code reviewer service 112 (e.g., in metadata service 116) and provided to the customer via a list recommendations API. In one embodiment, a compute instance (e.g., container) is torn down after running inference (e.g., which deletes all the pulled customer code).

Figure 12:
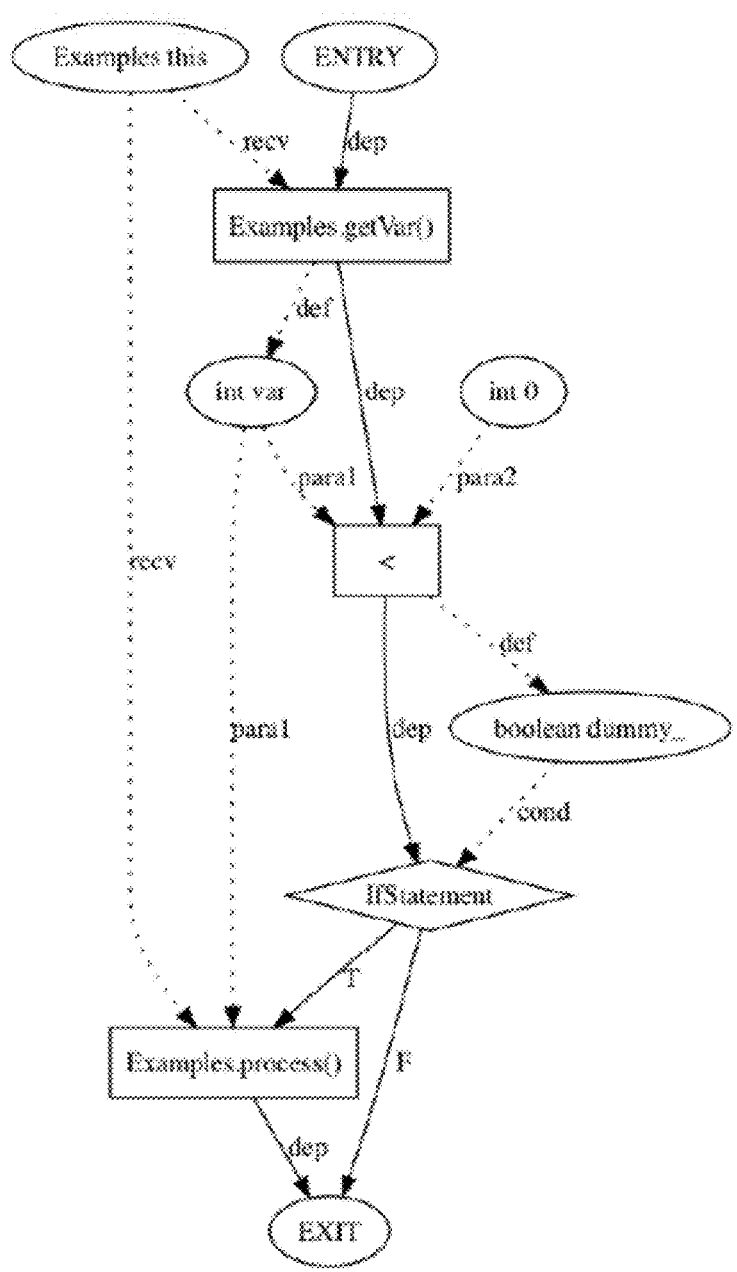
FIG. 12 is a diagram illustrating an exemplary control flow and data graph according to some embodiments.
Figure 13:
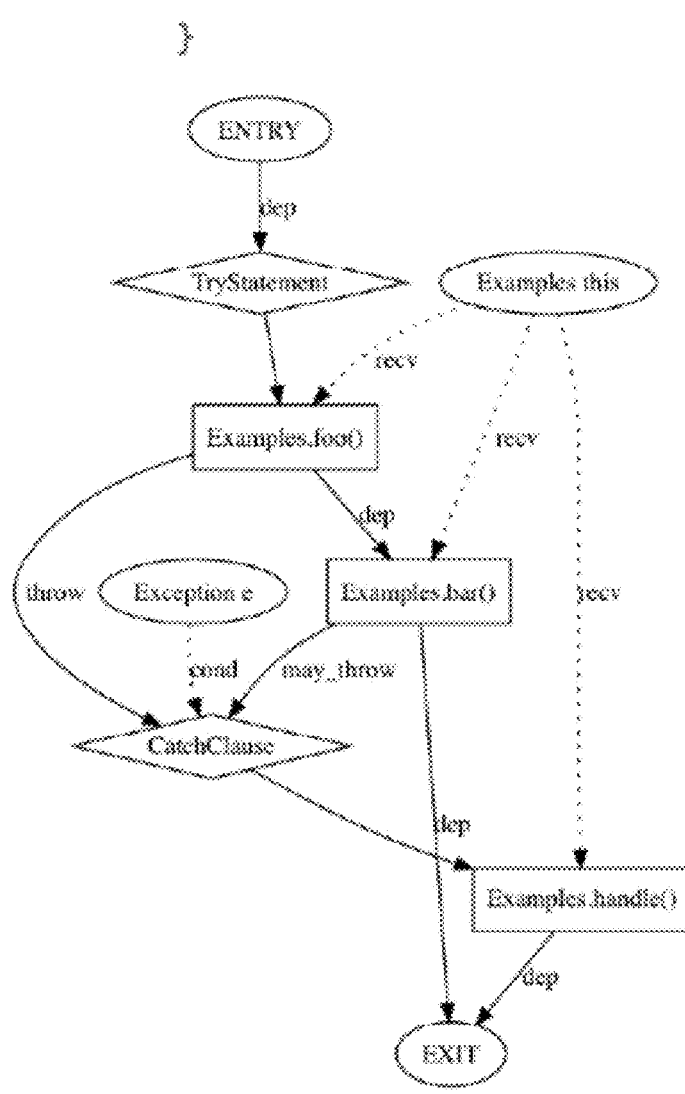
FIG. 13 is a diagram illustrating another exemplary control flow and data graph according to some embodiments.

In one embodiment, inference service 126 fetches the source code artifacts, validates, and extracts features, e.g., by parsing the source code into a control flow and data flow graph (e.g., as depicted graphically in FIGS. 12 and 13). In one embodiment, the control flow and data flow graph represents the dependencies between program elements from the source code, e.g., the graph is rich in context about the various relationships including type usages, and both data and control flows between program elements that permit the design and development of complex and semantic rules. In one embodiment, the inference service 126 generates recommendations 138 by running a combination of various machine learning model(s) 132 and/or rule(s) 134 with code recommendation service 130, e.g., code recommendation service 130 executed within a sandboxed environment of a compute instance (e.g., a container).

In certain embodiments, code recommendation service 130 supports running various types of rules and/or detectors, e.g., from simple regular expression (regex) based to complex program/semantic analysis-based rules. Additionally, or alternatively, code recommendation service 130 supports running one or more machine learning models (e.g., a model trained a detector to predict issue(s) with source code). In certain embodiments, the code recommendation service 130 provides various abstractions to write the rules that work at method, file, or the entire project context to design and implement such various types of rules. In certain embodiments, the code recommendation service 130 provides an interface so that user-defined rules 136 can be written to work directly on the source code (e.g., in text form or on extracted features from the source code).

In one embodiment, code reviewer service 112 includes a metrics monitoring service 140 to capture various metrics of the code reviewer service 112, e.g., metrics on the running of different rules, ways to whitelist or run certain rules in shadow, and/or allow versioning of the rules (e.g., version 1, version 2, etc. as rules are modified).

In certain embodiments, for each recommendation (e.g., both for pull-requests and repository inference), provider network 100 (e.g., code recommendation service 130) stores certain metadata based on the source code without storing the actual source code from customer code repository. In one embodiment, this metadata allows a user/code reviewer service to gather metrics and will act as a feedback loop for a model(s), e.g., as customers provide their feedback on these recommendations. Non-limiting examples of this metadata are a recommendation identification (ID), code repository metadata (e.g., provider, repository-name etc.), and/or source of recommendation (e.g., identification of the rule(s) and/or model(s) used for the inference).

Next, an example usage of code reviewer service 112 is described with reference to encircled numbers "1" through "15" of FIG. 1. In certain embodiments, code reviewer service 112 (e.g., frontend service 114) receives a request to perform a review of source code at the circle "1", for example, with the request identifying the particular source code and/or code repository 144 storing the source code. The request may be from user 102A utilizing a computing device 104 (for example, client 106 implemented by a computing device 104 outside the provider network 100, e.g., as part of an application installed on a personal computer or server computing device or as part of a web-based console provided by the provider network 100) to send one or more messages (e.g., API call(s)) to the provider network 100 to request the review of source code. The frontend service 114 in an embodiment of this example sends a message at circle "2" to cause metadata service 116 to create an inference workflow for that source code. The job orchestrator 118 in an embodiment of this example sends a message at circle "3" is to poll (e.g., sweep) the metadata service 116 for pending onboarding and inference tasks. If a pending task is an onboarding task, metadata service 116 in an embodiment of this example sends a message at circle "4" to cause onboarding service 152 to configure (at circle "6") the onboarding of the source code (e.g., via event router service(s) 146 as discussed herein). In one embodiment of this example, onboarding service 152 is to send a message at circle "5" to indicate to metadata service 116 that the onboarding is complete. In one embodiment, after the source code has been onboarded (e.g., including monitoring of the source code (e.g., repository 144) for an event to trigger a code review), a triggering event (e.g., a pull request or a user's explicit request) causes a corresponding message to be sent to event router services 146. In certain embodiments, a triggering event is a user 102B causing at circle "7A" a change detected by source (e.g., version) control service 142. In certain embodiments, a triggering event is a user causing at circle "7B" a change detected by webhook service 150. In one embodiment of this example, event handler 120 receives in event queue(s) 122 a message from event router services 146 for a monitored event and on-demand function 124 detects this message at circle "8". The event handler 120 (e.g., on-demand function 124 set-up to perform this action) in an embodiment of this example sends a message at circle "9" to cause metadata service 116 to create a job for this inference request (e.g., the code is to be reviewed now). The inference service 126 in an embodiment of this example detects the job and begins the inference request. As discussed above, the job orchestrator 118 in an embodiment of this example sends a message at circle "3" is to poll (e.g., sweep) the metadata service 116 for pending onboarding and inference tasks. In one embodiment of this example, on detection of an inference task (e.g., job), job orchestrator 118 sends a message at circle "10" to inference service 126 (e.g., to workflow service 200 discussed in reference to FIG. 2) to trigger an inference workflow. In certain embodiments, the inference service 126 performs one or more internal API calls to metadata service 116 at circle "11" to cause the inference job to be performed. The inference service 126 in an embodiment of this example sends (or causing the sending of) a message at circle "12" to access the source code that is to be reviewed. After the inference service 126 (e.g., code recommendation service 130) performs its review, it generates one or more recommendations 138 for the source code at circle "13" in certain embodiments. In one embodiment, the recommendation(s) 138 are sent to the code repository 144 at circle "14", e.g., for posting on a pull request. In one embodiment, a user performs an API call via frontend service 114 to access the recommendation(s) 138. In one embodiment, recommendation(s) 138 (e.g., results) may include an indication of "no recommendations" (e.g., because no predicted issues were identified) and/or a "success" or "failure" indication (e.g., indicating success and failure, respectively, of the inference job). Metrics may be monitored (e.g., collected) by metric monitoring service 140 at circle "15".

Code reviewer service 112 may also train one or more machine learning models 132 for use by code recommendation service in generating predicted issues and/or recommendations based on those predicted issues.

In certain embodiments, a pull request is the primary way for repository users to review, comment on, and merge code changes from one branch to another. For example, a user can pull requests to collaboratively review code changes for minor changes or fixes, major feature additions, or new versions of released software. The following is one possible workflow for a pull request:

A developer working in a repository named Repo, wants to work on a new feature for an upcoming version of a product. To keep their work separate from production-ready code, the developer creates a branch off of the default branch and names it Feature. The developer writes code, makes commits, and pushes the new Feature code into this branch.

If the developer wants other repository users to review the code for quality before the developer merges the changes into the default branch. To do this, the developer creates a pull request, e.g., with all of this occurring separately from code reviewer service 112 in FIG. 1. In one embodiment, the pull request contains the comparison between the working branch and the branch of the code where the developer intends to merge their changes (in this case, the default branch). The developer can also create an approval rule that requires a specified number of users to approve the pull request. The developer can specify an approval pool of users. Thus, other users can review the developer's code and changes, adding comments and suggestions. The developer might update their working branch multiple times with code changes in response to comments. The changes are incorporated into the pull request every time the developer pushes them to that branch, e.g., using source (e.g., version) control service 142. The developer may incorporate changes that have been made in the intended destination branch while the pull request is open, so users can be sure they are reviewing all of the proposed changes in context. When the developer and the reviewers are satisfied, and the conditions for approval rules (e.g., if any) have been satisfied, the developer (or one of the reviewers) merges the code and closes the pull request.

Figure 2:
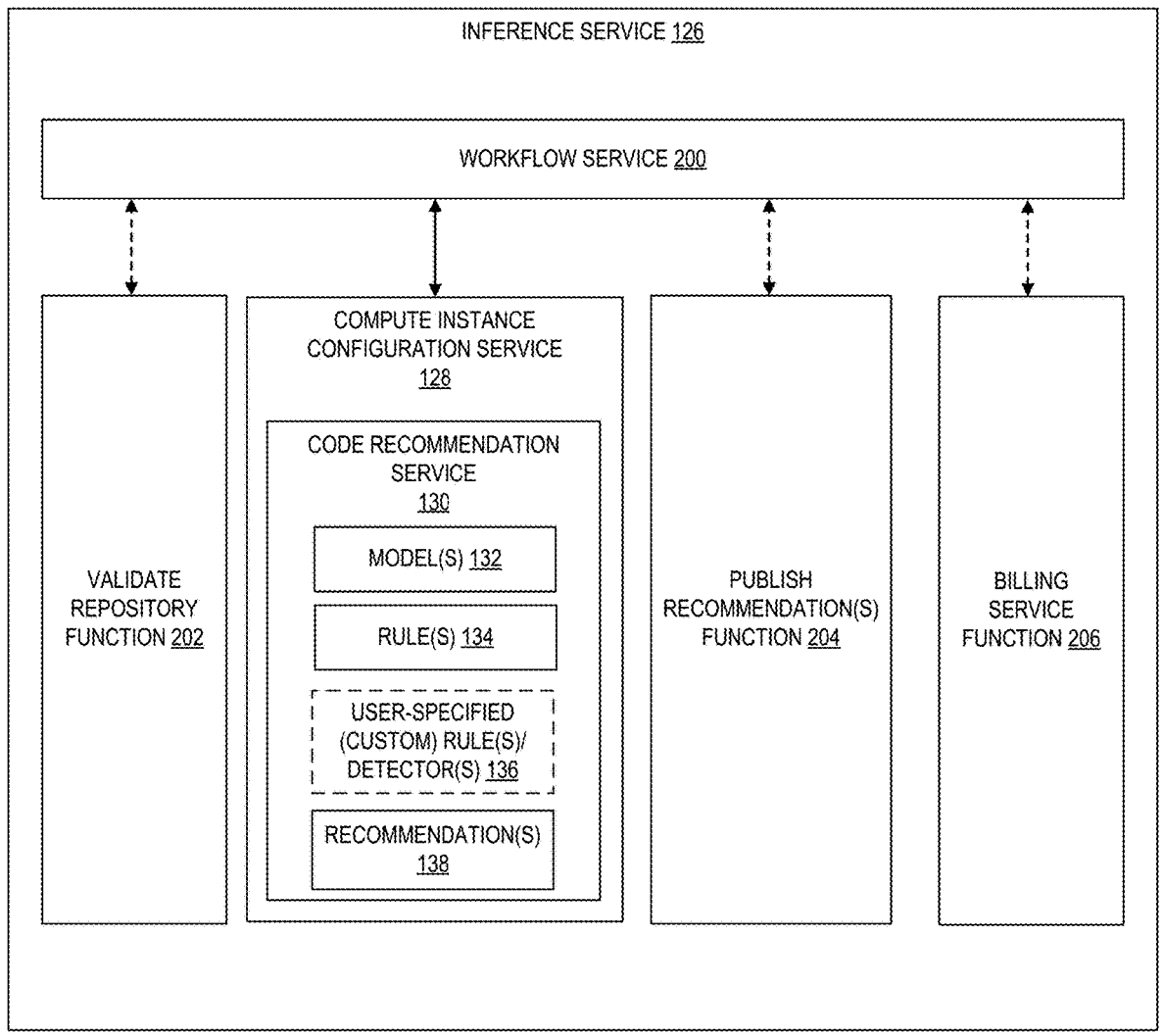
FIG. 2 is a diagram illustrating an inference service according to some embodiments.

FIG. 2 is a diagram illustrating an inference service 126 according to some embodiments. Inference service 126 may run one or more rules 134 and/or one or more machine learning models 132 to produce recommendations on a customer's source code. In certain embodiments, (e.g., multi-tenant) inference service 126 interacts with other components of code reviewer service 112, including, but not limited to, event handler(s) 120, metadata service 116, and job orchestrator 118 to fetch an inference job and run it securely and at scale in a sand-boxed environment (e.g., as managed by compute instance configuration service 128). In certain embodiments, inference service 126 provides recommendations 138 for specific source code (e.g., less than the entire repository) that helps to improve the code quality of specific source code, recommendations 138 for a given repository 144 that helps to improve the code quality of the entire repository, is multi-tenant and handles customer's code repositories securely, is capable of running rules 134 (and/or user-defined rules 136) and integrating with machine learning models to provide recommendations on multiple categories (e.g., concurrency, best practices, etc.), is scalable to (e.g., concurrently) run multiple jobs (e.g., either for an entire repository or for a proper subset of files within a repository) asynchronously (e.g., within a certain time threshold for completion), or any combination(s) thereof.

As two non-limiting examples, a customer can get code recommendations from code recommendation service 130 on a repository (1) as a Pull Request inference where a customer onboards a given repository so that the code recommendation service 130 posts recommendations 138 on every pull request on that repository and/or (2) as an On-Demand inference where a customer uses a create recommendation job API to trigger inference on the entire code repository. In one embodiment, this API call results in an asynchronous job with a job ID that fetches the repository and runs inference on it. In one embodiment, once the job finishes, the customer can view code recommendations generated by the job in a console or by calling a list recommendations API that includes the job ID. In one embodiment, a customer can use On-Demand inference before (and after) onboarding the code repository as a source for code recommendation service 130. In certain embodiments, recommendations for both types of inferences (1) and (2) are generated via the same inference system asynchronously.

Inference service 126 in FIG. 2 includes a validate repository function 202 to validate that the repository is the correct repository for the inference request. Inference service 126 in FIG. 2 includes a publish recommendation(s) function 204 that publishes the recommendation(s) 138 for a user, e.g., publishes them back to the repository (e.g., on a pull request of the repository). Inference service 126 in FIG. 2 includes a billing service function 206 that tracks the resource utilization for an (e.g., each) inference request, e.g., and causes an invoice to be sent based on that utilization.

Figure 3:
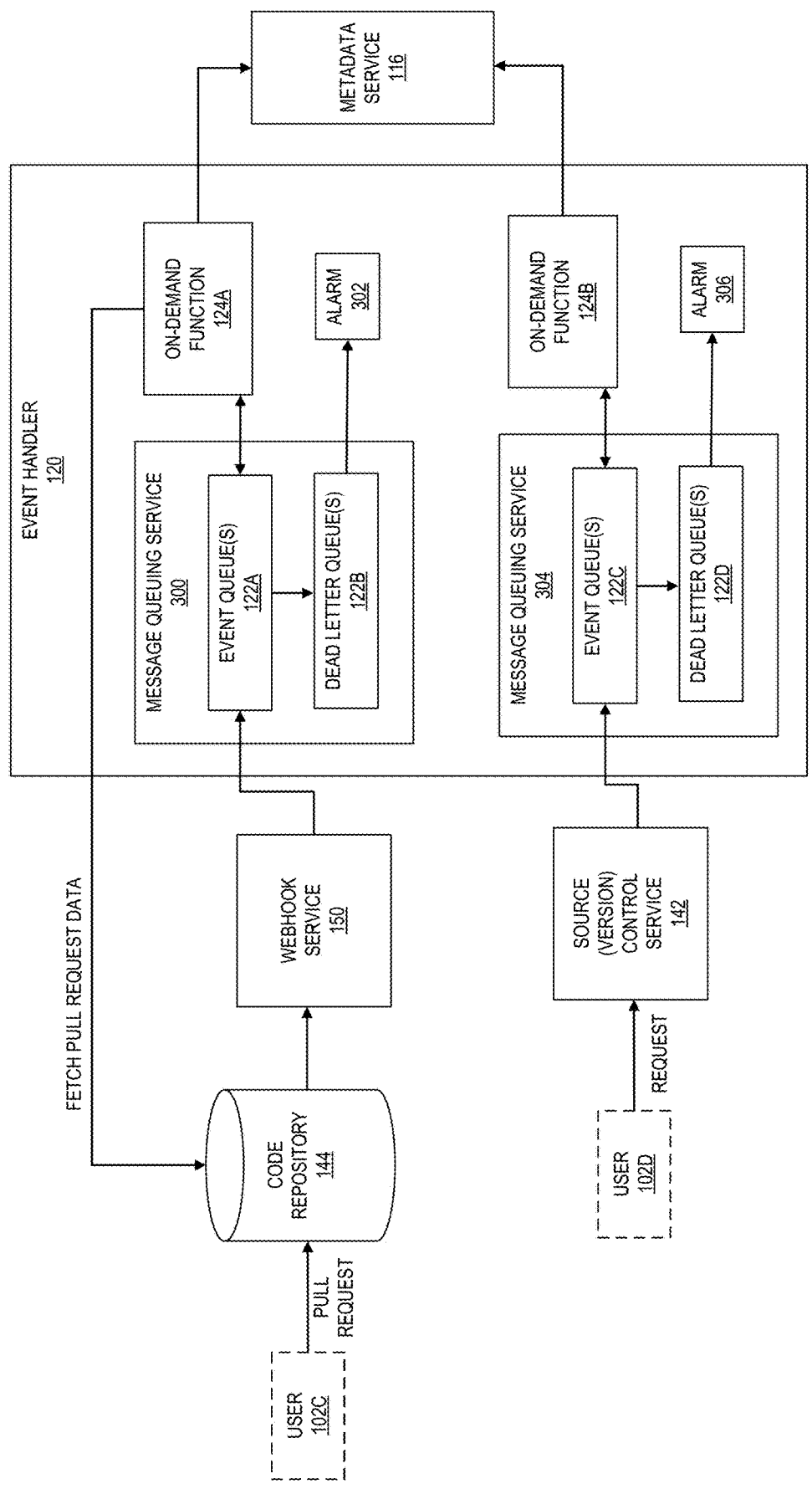
FIG. 3 is a diagram illustrating an event handler according to some embodiments.

FIG. 3 is a diagram illustrating an event handler 120 according to some embodiments. In certain embodiments, once a customer has onboarded their code repository (e.g., with either source (e.g., version) control service 142 or webhook service 150), and any other resources are setup as part of the onboarding workflow, the event handler 120 will get notified for every pull request on the code repository.

In certain embodiments, for each of supported code repository provider, once a pull-request is posted on the code repository, that event is routed through the (e.g., external) router (e.g., not "owned" by code reviewer service). For example, by setting up a corresponding monitoring event in source (e.g., version) control service 142 or by setting up a (e.g., internal to provider network 100) webhook with webhook service 150 (e.g., "owned" by the repository). In certain embodiments, the router is to receive the event notification and then route it through event handler 120 via one or more queues 122A-122B (e.g., and 122C and 122D) (e.g., "owned" by code reviewer service 112).

In one embodiment, on-demand function 124A is configured to monitor for a message from event queue 122A of message queuing service 300 indicating an event (e.g., pull request) (e.g., created by user 102C) was detected by webhook service 150 and that message causes a job request message to be sent to metadata service 116, and metadata service 116 then enqueues an inference task. On-demand function 124A may also cause processing of the message from the event queue 122A.

In one embodiment, the processing of a message includes one or more of the following: (i) reading the customer's provider network account ID, username, and/or repository identifiers, e.g., along with other metadata about the pull-request, the message for the pull request event contains, (ii) calling metadata service 116 to get an authorization token. (e.g., where metadata service stores the authorization token which was created at the time of customer onboarding), (iii), calling the code repository (e.g., code repository service) to list the commits in a pull request to get the parent of the latest commit in the pull request such that the parent commit allows a service to post comments only on the difference between two subsequent commits shown on the repository (e.g., to avoid posting duplicate comments in different commits), and/or (iv) calling metadata service 116 with the metadata of the pull request to create and enqueue an inference job for the pull request. In one embodiment, a pull request will have the head and base commits so a service can obtain the differences of the pull request (e.g., in the case of multiple commits in a pull request that displays all comments on every commit in the pull request in a single view)

In one embodiment, on-demand function 124B is configured to monitor for a message from event queue 122C of message queuing service 304 indicating an event (e.g., request) (e.g., from user 102D) was detected by source control service 142 and that message causes a job request message to be sent to metadata service 116, and metadata service 116 then enqueues an inference task. On-demand function 124B may also cause processing of the message from the event queue 122C.

In one embodiment, the processing of a message includes one or more of the following: (i) reading the customer's provider network account ID, username, and/or repository identifiers, e.g., along with other metadata about the pull-request, the message for the pull request event contains, and/or (ii) calling metadata service 116 with the metadata of the pull request to create and enqueue (e.g., trigger) an inference job for the pull request.

Message queuing service 300 includes a dead letter queue 122B to capture requests from the event queue 122A that fail an (e.g., automatic) retry attempt(s), for example, failure to connect to a repository or being unable to call metadata service 116. Alarm 302 may be set up to monitor dead letter queue 122B and send an alarm on a failure that is enqueued in dead letter queue 122B. For example, code reviewer service may take a remedial action based on the alarm being activated, e.g., and then move the event message from the dead letter queue 122B back into the event queue 122A. In certain embodiments, e.g., where the on-demand function 124A is able to call code repository 144 but the call fails (e.g., because the authorization token has expired or the webhook request is invalid), the error is not handled (e.g., they are not candidates for retrying).

Message queuing service 304 includes a dead letter queue 122D to capture requests from the event queue 122C that fail an (e.g., automatic) retry attempt(s), for example, failure to connect to a repository or being unable to call metadata service 116. Alarm 306 may be set up to monitor dead letter queue 122D and send an alarm on a failure that is enqueued in dead letter queue 122D. For example, code reviewer service may take a remedial action based on the alarm being activated, e.g., and then move the event message from the dead letter queue 122D back into the event queue 122C. In certain embodiments, e.g., where the on-demand function 124B is able to call its code repository but the call fails (e.g., because the authorization token has expired or the webhook request is invalid), the error is not handled (e.g., they are not candidates for retrying).

As noted above and referring again to FIG. 1, instead of using source (e.g., version) control service 142 or webhook service 150, certain embodiments herein allow a customer to call an inference API of code reviewer service to trigger inference of certain source code in a code repository. One example flow is: (i) a customer calls (e.g., public) create recommendation job API of frontend service 114 and passes information about the code repository and other metadata used to fetch the code repository, and (ii) frontend service 114 then forwards the request to metadata service 116 to create and enqueue an inference job for the provided code repository.

Figure 4:
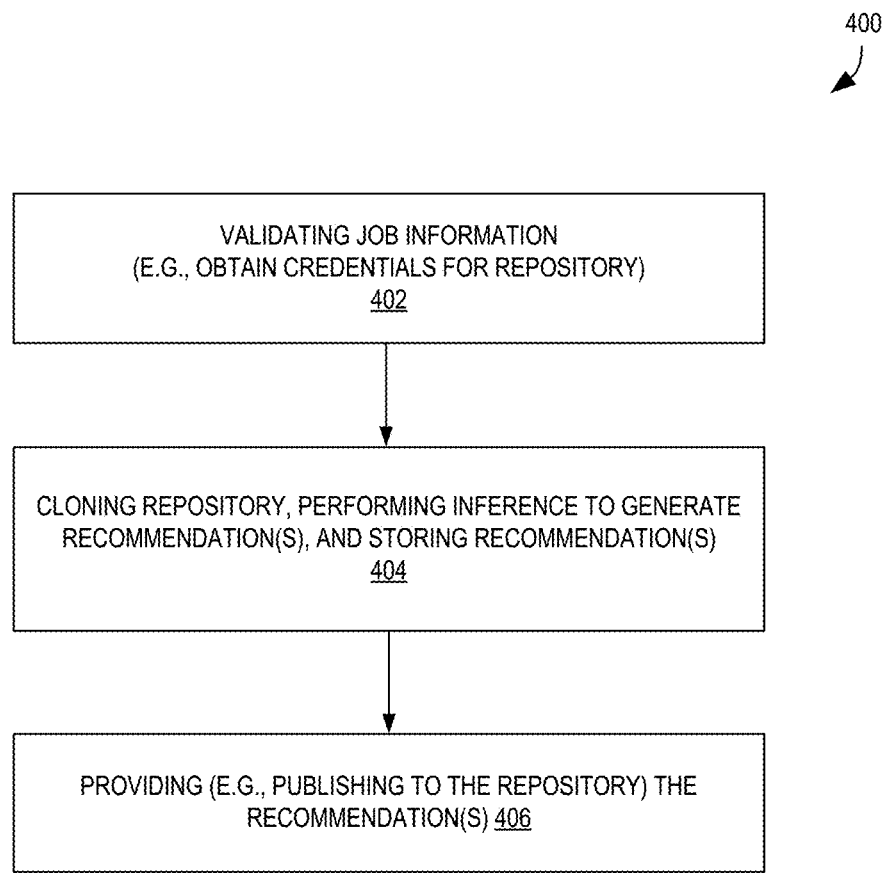
FIG. 4 is a flow diagram illustrating operations of a method for a code review service according to some embodiments.

FIG. 4 is a flow diagram illustrating operations of a method for a code review service according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by code reviewer service 112, etc. of the other figures.

The operations 400 include, at block 402, validating job information (e.g., obtain credentials for repository). The operations 400 further include, at block 404, cloning repository, performing inference to generate recommendation(s), and storing recommendation(s). The operations 400 further include, at block 406, providing (e.g., publishing to the repository) the recommendation(s).

Referring again to FIG. 1, once metadata service 116 enqueues an inference job, job orchestrator 118 picks up the job and triggers an inference by inference service 126 in certain embodiments. Once the inference workflow is triggered by GuruJobOrchestrator, as part of each workflow, the following (1)-(4) are executed in one embodiment.

Part (1) of the workflow includes fetching relevant source code artifacts to run the inference on (for example, depending on the type of inference (e.g., pull-request or entire repository). These artifacts may be fetched using a repository clone API and the code artifacts are stored in a sandboxed environment. In certain embodiments for a pull request, a file difference ("diff") is then obtained from the cloned repository. In certain embodiments to fetch the source code repository, the following are details around the credentials used: (i) when customer has onboarded a given repository, certain resources are created that allow access to their code repositories. For certain repositories, an SLR is used along with system tags to fetch the customer repository. For other repositories, an authorization token is used to fetch repositories. (ii) When a customer has not on-boarded their repository: as mentioned above, when a customer has not onboarded, they can still call the inference APIs to perform full code repository inference. In one embodiment of (ii) (e.g., for both a console and API), the code reviewer service may use a customer's credentials (such as, but not limited to, an access token (e.g., fast access (FAS) token)) where there is not any creation of SLR that happens during onboarding. In one embodiment of (ii) (e.g., for a console), a customer will go through the same flow as in onboarding to fetch an authorization token and a connection token and then calls a create recommendation job API passing the connection token. In one embodiment of (ii) (e.g., for an API), a customer is to pass a Personal Access Token (PAT) where the authorization flow will not be available via an API call. These credentials will then be used to pull code repository during certain embodiments of inference.

Part (2) of the workflow includes validating the input data and ensuring that the code artifacts are parsed in a secure manner without having execute permissions or being instantiated in the inference process.

Part (3) of the workflow includes extracting feature(s) and performing an inference. In certain embodiments, as part of an inference, inference service 126 runs rule(s) 134 and/or models 132 to predict one or more issues with the source code, e.g., and to provide one or more recommendations to remedy the one or more issues. In certain embodiments, a rule and/or model expects extracted features from the source code in form of a graph data structure (e.g., as discussed in reference to FIGS. 12 and 13 herein). In one embodiment, this data structure represents the dependencies between program elements from the source code, e.g., it is abundant in context about the various relationships including type usages, and both data and control flows between program elements to allow for the design and development of complex and semantic rules. Once the data structure is extracted from the source code, it (e.g., along with the reference to source code) will be used to execute rules in the same sandboxed environment in certain embodiments.

In one embodiment, code recommendation service 130 runs one or more detectors in various categories to provide recommendations and gather metrics around the rule execution. The rules may be from one or more categories such as best practices, concurrency, and resource leaks. In one embodiment, code recommendation service 130 provides various abstractions to write the rules that work at method, file, or the entire project context making it user friendly to design and implement various types of rules. In one embodiment, code recommendation service 130 also provides various interfaces such that rules (e.g., user-defined rule(s)/detector(s) 136) can be written to work directly on the source code in text form or on extracted features. In one embodiment, code recommendation service 130 use a control flow and data flow graph that represents the extracted features from the source code. In one embodiment, code recommendation service 130 provides mechanism to capture various metrics on running different rules, ways to whitelist or run certain rules in shadow, and allows versioning of the rules.

To capture various changes made to the rules and its impact, certain embodiments herein track various versions of each rules to determine various deviations of behavior, correctness and possibly customer impact that are seen in production while running these rules on various customer code artifacts. In one embodiment, code recommendation service 130 includes: (i) Rule implementation versioning to keep track of a rule's design, development, and maintenance. As one example to do this, each rule will have a version number associated with it. A rule will start with the initial version (e.g., 1.0) and kept updated as the implementation of the rule evolves. This version number will also be associated with the metrics that the rule engine will emit. Since these rules may also be written in form of usual code implementation and checked-in using a code repository service, the version number along with the code check-in allow for reverting a version in case of any issues detected via metrics. (ii) Training dataset versioning: As rules are developed and trained on the training dataset, it may be desirable to track which version of the training dataset is being used to validate the rules. This will allow determination, during developing and maintaining of rules, of whether any changes in the precision of the rules is due to change in rules implementation or change in the dataset. (iii) Metrics: in one embodiment, code reviewer service 112 (e.g., metrics monitoring service 140) is to emit various metrics about rules execution (e.g., success and failure rates), latency, number of recommendations per rule, etc. and these metrics may be tagged with the given version of the rule. This allow certain embodiments herein to track performance of various versions of rules.

Part (4) of the workflow includes aggregation of results and workflow completion. In certain embodiments, this includes aggregating recommendation results from rules and models and providing them as output (e.g., posting them to the pull request or storing them for a repository inference). In one embodiment, code recommendation service 130 allows for the filtering and/or suppression of recommendations from certain rules and models. For model recommendations, code recommendation service 130 is to filter out recommendations that are below certain thresholds in certain embodiments. This may be used to suppress certain recommendations based on customer feedback. Certain embodiments herein utilize a machine learning model 132 to (e.g., auto) suppress certain recommendations based on customer feedback (e.g., in real time). For each recommendation (e.g., both for pull-requests and repository inference), code recommendation service 130 store certain metadata without storing the actual code from a customer's code repository in certain embodiments. This metadata may thus allow code reviewer service 112 to gather metrics and act as a feedback loop for the model(s) 132 as customers provide their feedback on these recommendations. Some non-limiting examples of metadata are: recommendation ID, code repository metadata (e.g., provider, repository-name etc.), source of recommendation (e.g., ID of each rule and/or model), etc.

In certain embodiments (e.g., for pull-requests), code reviewer service 112 will not store any of the recommendations that references customer code and will instead simply post them as comments to pull-request origin. In case there are failures to post the comments, in certain embodiments the workflow will retry for threshold time period (e.g., one hour). If the workflow fails even after those retries, certain embodiments herein mark the job as failed and will notify the customer, e.g., via metrics monitoring service 140. In certain embodiments, customers can choose to add alarms that are triggered by these metrics.

In one embodiment, the recommendations 138 are stored (e.g., encrypted) within provider network 100 (e.g., within a compute instance of inference service 126) with a time threshold that when exceeded, causes that stored data to be inaccessible (e.g., deleted).

In one embodiment, these recommendations are provided to the customer via a list recommendations API and shown on the console. Both the inference job and its recommendations may have a time threshold that after which, they will expire and will not be accessible to the customer. The expiry will result in the code reviewer service 112 storing these recommendations 138 for a short, transient period instead of retaining them.

In certain embodiments, compute instance configuration service 128 allows each job to run in its own (e.g., secure) environment (e.g., container) that allow for isolation between its tasks.

Referring now to dependencies and consumers, in certain embodiments the metadata service 116 includes an internal API service that handles metadata of the repository association and various tasks running in the system. In one embodiment, event handler 120 and inference service 126 calls various APIs of metadata service 116 to enqueue and handle inference workflows. In certain embodiments, the job orchestrator 118 is responsible for fetching enqueued inference tasks and triggering them. In certain embodiments, inference service 126 (e.g., workflow service 200 in FIG. 2) handles various tasks within the inference workflow. In certain embodiments, compute instance configuration service 128 runs inference tasks in sandboxed environments. In certain embodiments, event handler 120 (e.g., on-demand function(s) 124) is used to consume various pull request events. In certain embodiments, event handler 120 (e.g., message queuing services 300 or 304 in FIG. 3) maintains an event queue that holds pull request events. In certain embodiments, request monitoring service 148 is used to push pull requests events happening on customer code repositories. In certain embodiments, webhook service 150 handles the pull requests events from a code repository service and publishes pull requests to event handler 120 (e.g., message queuing services 300 or 304 in FIG. 3).

Figure 5:
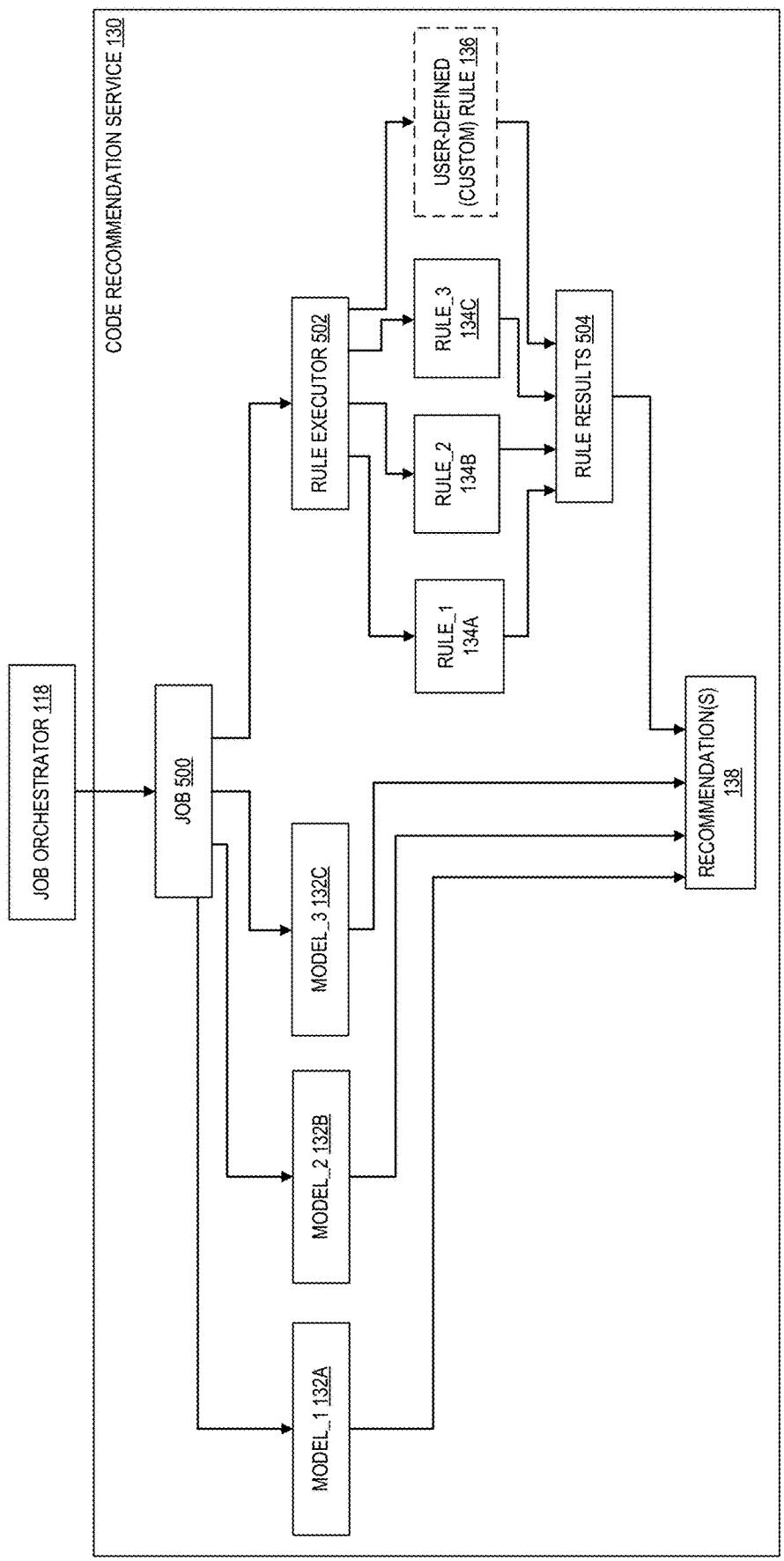
FIG. 5 is a diagram illustrating a code recommendation service according to some embodiments.

As discussed above, a plurality of rules 134 and a plurality of models 132 may be utilized to generate code recommendation(s). FIG. 5 is a diagram illustrating a code recommendation service 130 according to some embodiments.

This section will provide details about types of rules. Rules can be categorized in multiple ways. One way is to categorize rules by the different data types that may be utilized. For example, (1) Source code based rules (e.g., that use source code as a input), (2) control flow and data flow graph based rules (e.g., using a graph derived from source code) (e.g., a MUgraph), and (3) Abstract syntax tree (AST) based rules (e.g., using AST extraction from source code).

Different rules can require different context to evaluate code and make suggestions: (1) rules that only need changed file as context (e.g., that use changed files only), (2) rules that need all source code files in current package source folder as context, (3) rules that use all files of defined type in current package as context, (4) rules that use an entire package as context including test folder, or (5) rules that use all downstream dependencies as context.

Certain embodiments herein take both data types and context into consideration, and weigh in current implementation to categorize rules. (1) Regular expression (regex) based rules that (e.g., only) use changed file as context. This rule may apply a list of specified regex expressions to source code, and return corresponding comment and line number if there is any matching. In certain embodiments, it does not require any feature extraction or any additional context, and can be applied to changed file source code directly. (2) Graph based rules that use pre-processing to extract the graph from source code and (i) with changed files as context, (ii) with all source files from current package as context, or (iii) with all files from current package as context. (3) Domain-specific Language (DSL) based rules that have following statements: rule setup, precondition, and actual check. Rules fitting here is to have a defined sequence of actions. It can be a combination of function calls as a sequence of statements. It can also be nested functions or chained methods. Rules will be applied to source code file: (i) with changed files as context, (ii) with all source files from current package as context, or (iii) with all files from current package as context. (4) Other data type based rules that use a preprocessing of feature extraction. Depending on the model type used, preprocessing may then perform feature extraction on source code and pass required model to execution step. Same data type can share the same feature extraction process. Data types can be AST or other.

Code recommendation service 130 includes a rule executor 502 that allows for (i) rule orders (e.g., that supports labeling the executing order of rules). A rule can be a precondition for other rules. For example, rule1 and rule2 can all wait for rule3 to finish before starting. Conditional rule can be defined using this priority and determine rule execution. Code recommendation service can build on top of this to make more complicated sequences if needed. (ii) Composite rules that allows for the creation of composite rules from primitive ones (e.g., grouping multiple rules). A composite rule can be created as a parent rule that have multiple children rules. If all conditions are satisfied or from different rules, a different action can be executed. Rules can be grouped in the same category to emit metric together, or used to divide rules running in different threads, or use to apply complicated regex, or graph using different conditions. (iii) Activation Rule Group supports grouping multiple rules and only uses (e.g., fires) the first rule that meets the condition. This can be used for a set of rules, when all their conditions are satisfied, yet a user only wants to generate a comment from one of the rules. (iv) Custom Rule Engine offers the flexibility to run customize rule engine. (v) Rule Engine Parameters allows for rules to be handled in different ways. For example, it can skip following rules when a rule is applied, it can skip following when there is a rule that fails, it can skip following rules if a rule is not triggered, and/or it can skip following rule when priority exceeds certain threshold.

The below discusses a rule interface design. The term "facts" may refer to a set of known inputs at the time of firing rules, e.g., holding a HashMap<String, Object>. Each fact may have a unique name. Any object can act as a fact.

(1) If the input that inference is to be performed on is source code, can (a) pass as a list of file paths or (b) iterate file path list and read source code to memory that inference is to be performed on.

(2) Some rules may use extracted features that are derived from source code. When a new rule category gets introduced with new extracted feature model type, it may define a new fact type.

Feature extracting may be performed (a) prior to firing any rule (e.g., when initializing facts and reading in source code files, extract all type of features needed for upcoming rules or (b) make feature extraction a prerequisite rule of rules that requires derived features.

(3) Rule result(s) may be stored for each recommendation that a rule generates. In one embodiment, the rule result has a list of rule findings that contains following variables: file path, startLine, endLine, comment, rule name, confidence score, priority (when there are too many findings on same file, use priority to filter finding before surfacing to customer), or any combination(s) thereof.

In FIG. 5, job 500 may include an indication of various models (132A-132C) and rules (134A-134C and/or 136). The number of rules and models shown is merely and example, and any single rule, plurality of rules, single model, or plurality of models may be used. Rule results 504 may thus include a result from one rule or more than one rule. In certain embodiments, code recommendation service uses the outputs from the model(s) and/or rule(s) to generate recommendations 138.

Figure 6:
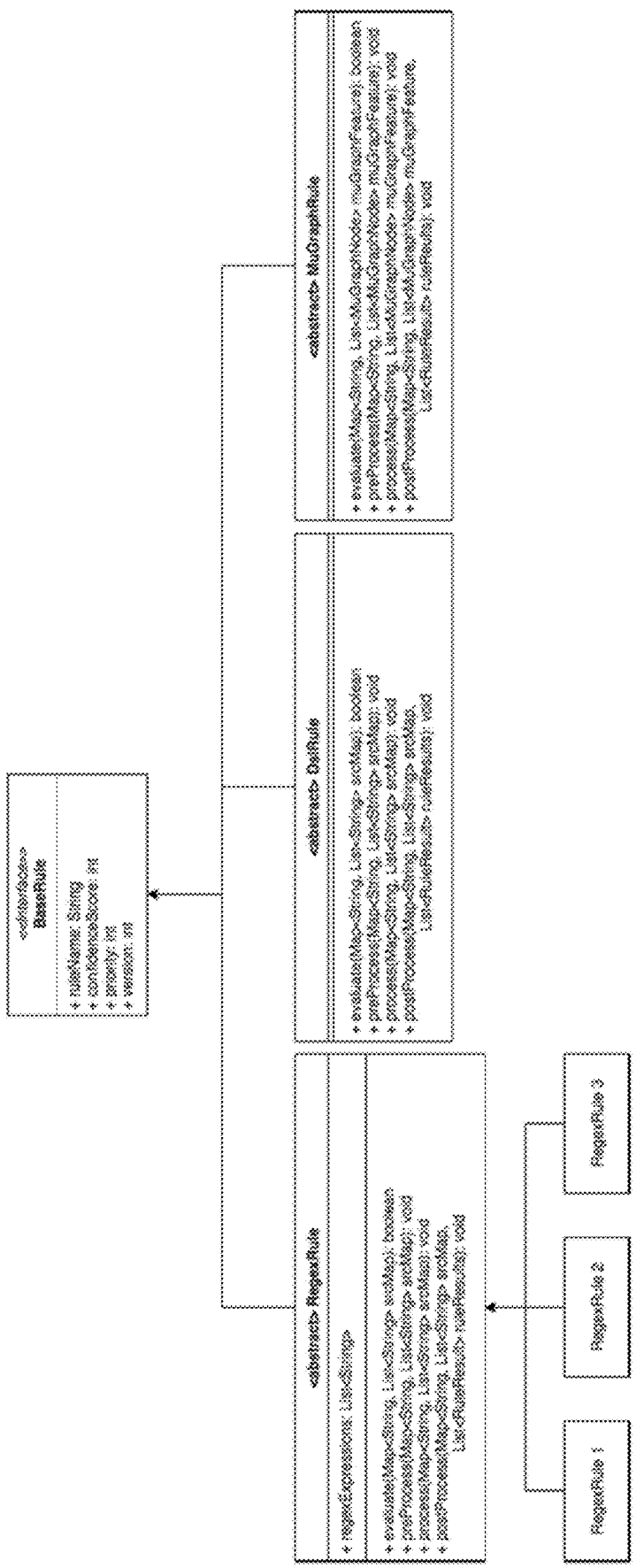
FIG. 6 is a diagram illustrating example rule formats according to some embodiments.

FIG. 6 is a diagram illustrating example rule formats according to some embodiments. FIG. 6 depicts a format where a base rule has one or more of the following properties: rule name: as a rule identifier, confidence score: for filtering out findings, priority: execution order, version: for rule version control, metrics usage. Certain embodiments herein store a rule version audit trail to keep track of history if needed.

In one embodiment, rules are sorted into different categories based on the (e.g., fact) type needed. An interface may be implemented for each category. Categories may share common sequence of actions, e.g., preProcess, Process, and postProcess.

In one embodiment, PreProcess field of a rule is used to define a condition check before firing the rule. Condition checks can include but are not limited to following use cases/examples: (i) suppression check to suppress rules based on customer feedback (for example, if a user chose to opt out a rule, do not surface any findings from this rule), (ii) code version check, (iii) package version check, and/or (iv) regex condition check.

In one embodiment, Process field of a rule is used to define the analysis and generate findings.

In one embodiment, PostProcess field of a rule is used to define the metric(s) that are to be output for given findings and rule.

Each individual rule can also define additional actions in their interface to handle category specific ones. Utilities can also be introduced to serve a rule's need. Similar rules that are sharing same logic but make different recommendations can be integrated in one single rule. Certain embodiments herein define a format to pass in specific variables, conditions, and/or recommendations that each rule is analyzing.

Referring again to FIG. 5, certain rules are executed by rule executor 502 with the flow including: (1) registering with the code recommendation service 130 the rule(s) to be executed for a particular job 500, (2) creating the inputs (e.g., "facts") such that (i) fact builder reads the input file path and loads source code, (ii) the fact builder optionally perform feature extraction and store it (e.g., to facts map), and (iii) initializing a field to store rule detection result (e.g., rule results 504), (3) applying (e.g., firing) rules (e.g., including a user-defined configurations of running rules) and in one embodiment, if multiple rules are fired and one rule fails due to unexpected exception, it will not affect other rules that are running in parallel, e.g., it will only affect the rules that have a chain dependency on this failed rule, such as prerequisite rule or composite rule, (4) collect results, and (5) filtering results (e.g., to eliminate duplicate findings (too many same suggestions for same file), similar findings (different rules generating similar recommendations), overlapping findings (too many suggestions on the same line), etc. The filter(s) can be based on rule finding priority, confidence score, and/or a customized value each rule defines.

Metrics (e.g., generated) by metric monitoring service 140 may include any one or combination of: (1) availability metrics (e.g., bad request count (Error), modeled exceptions count (Fault), and/or runtime or not modeled exceptions count (Failure)), (2) rule specific metrics (e.g., number of findings per rule per request, number of findings for all rules per request, number of requests that have zero findings of individual rule, number of requests that have zero findings of all rules, number of rules fired successfully per request, and/or number of rules fired failed per request), (3) traffic metrics (e.g., total file size for each request and/or if a rule has an execution condition, the number of requests that pass the execution condition check and are executed), (4) duration metrics (e.g., duration to execute each rule and get findings per request, duration to read in files per request, and/or duration to extract features per request) and/or (5) alarms (e.g., spike in bad request count and/or runtime exception failure count exceeding a threshold value for a time period).

Views on coding best practices, as well as what it means to enforce code hygiene and quality, may vary vastly across teams and organizations. The ability to extend and customize inference service 126 can help customers adapt it to suit better their needs.

Rules workbench enables users to define custom rules (e.g., and detectors). In certain embodiments, users can use one of three modes to define rules: (1) use the guided workflow to come up with a rule definition and validate against sample code, (2) start with sample code and ask code reviewer service to recommend rule(s), refine these rules, and validate against sample code, and (3) implement a supported interface for a user to build a custom implementation of a rule and host it on compute environment of their choice. In certain embodiments, the inference service 126 supports the ability for customers to share an endpoint to a custom detector (e.g., hosted by the customer) so that they can be run as part of a base set of rules and/or models.

In certain embodiments, a detector is implemented as machine learning model(s) or rule(s). In certain embodiments, the inference service 126 supports running detectors at method, file, or the entire project context allowing for the design and implementation of various types of rules/detectors. In certain embodiments, the inference service 126 supports various interfaces so that rules can be written to work directly on the source code in text form or on extracted features. For each inference job, in certain embodiments the inference service 126 may run (e.g., in addition to non-user defined rules of the inference service 126) user defined rules and/or (e.g., user-hosted) detectors to provide recommendations on code. In one embodiment, the inference service 126 reports metrics (e.g., to metrics monitoring service 140) for all rules/detectors it runs that can be used by users to customize and adapt their rules/the code recommendation service 130.

Figure 7:
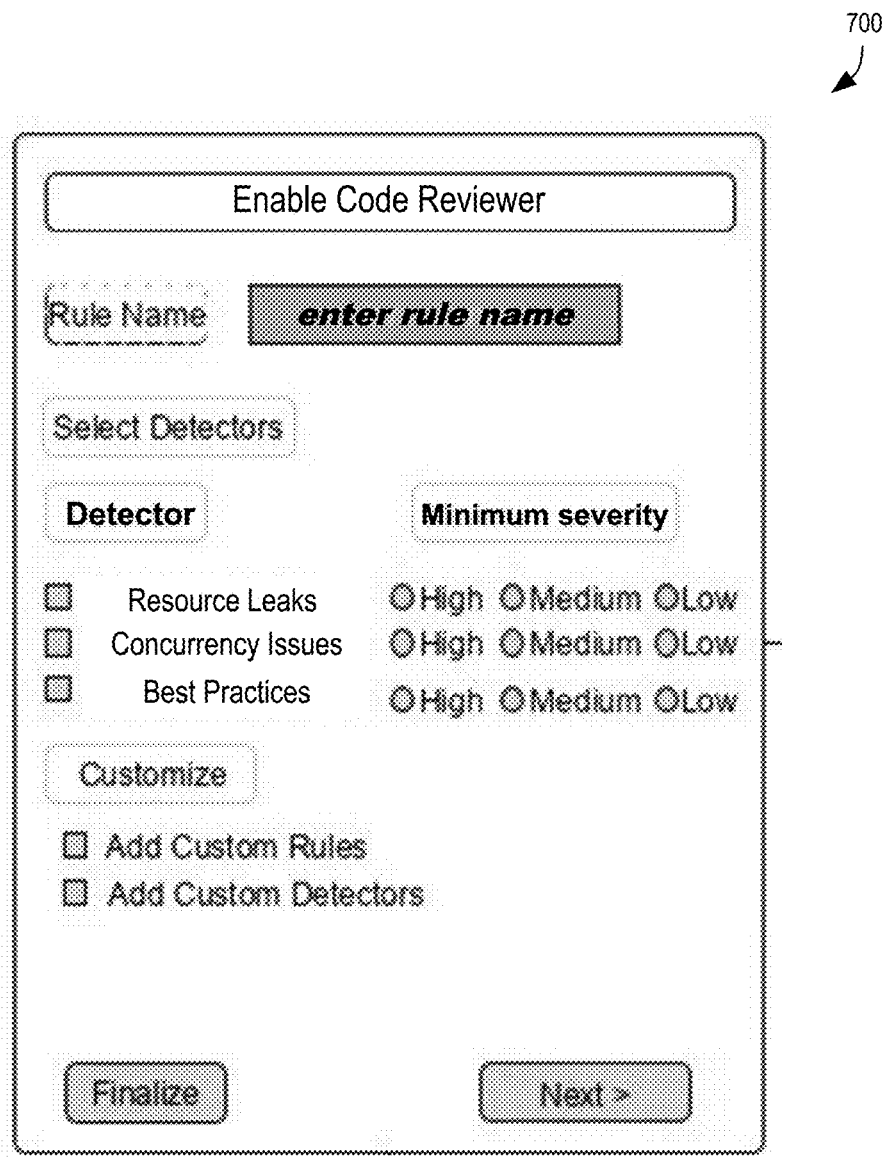
FIG. 7 is a diagram illustrating an exemplary graphical user interface for inputting a request to perform a review of source code according to some embodiments.

FIG. 7 is a diagram illustrating an exemplary graphical user interface 700 for inputting a request to perform a review of source code according to some embodiments. Depicted graphical user interface 700 includes a plurality of interface elements that allow a user to select various rule(s), detector(s), as well as custom rule(s) and custom detector(s). In one embodiment, a rule is more specific than a detector. One example of a detector, when executed, causes a search of source code for security leaks. Interface element, may be a checkbox, button, dropdown menu, etc. If not custom rule or detector is desired, a user may select Finalize to cause a code review request to use the selected detectors (and any sensitivity level selected) and/or selected rule(s) in performing an inference.

Figure 8:
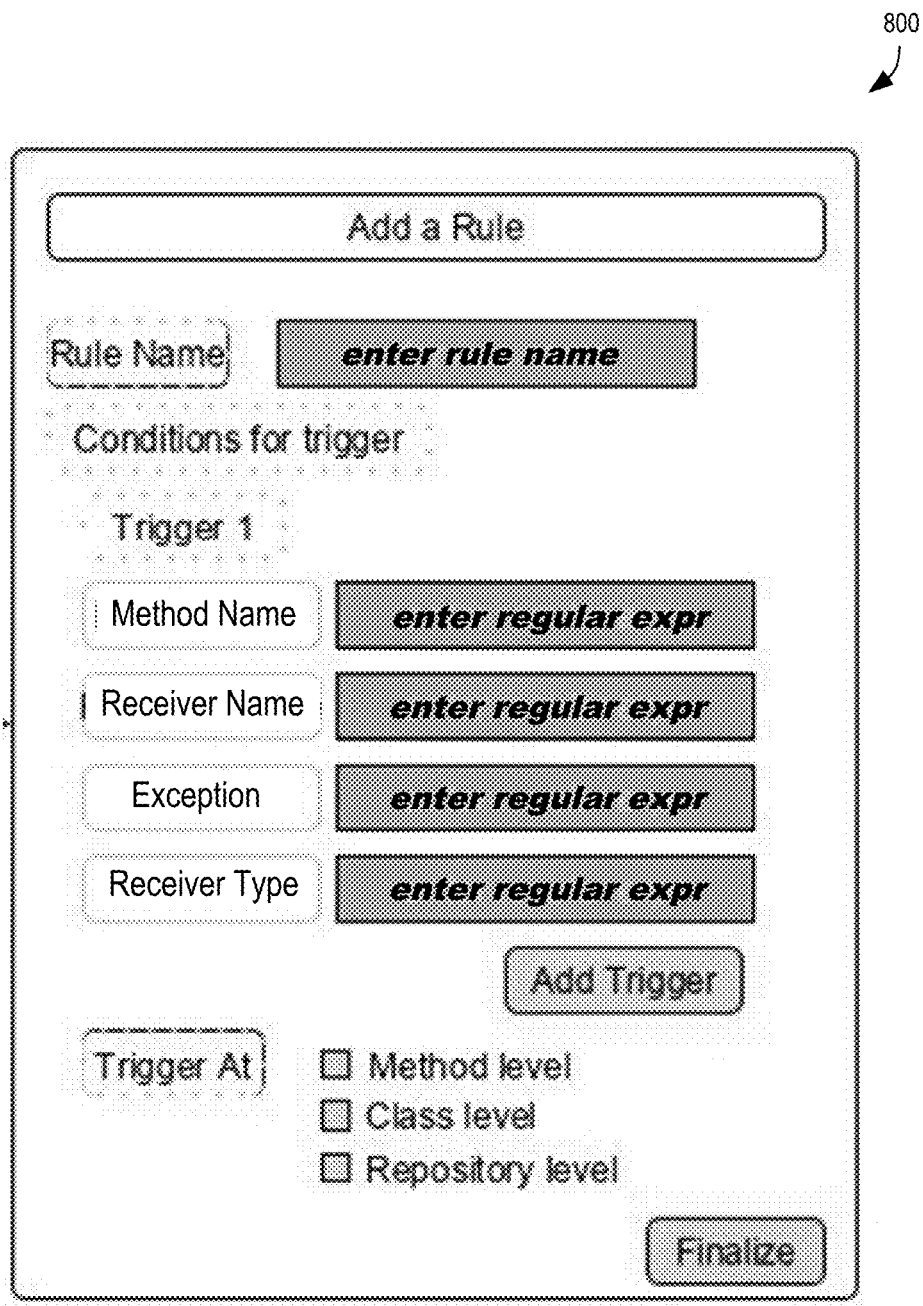
FIG. 8 is a diagram illustrating an exemplary graphical user interface for inputting a custom rule for a request to perform a review of source code according to some embodiments.

FIG. 8 is a diagram illustrating an exemplary graphical user interface 800 for inputting a custom rule for a request to perform a review of source code according to some embodiments. For example, selecting Add Custom Rules and Next for graphical user interface 700 may cause display of graphical user interface 800. Depicted graphical user interface 800 includes a plurality of interface elements that allow a user to select various rule(s), triggers for the rule(s), method name, receiver name, exception(s), and/or receiver type (e.g., data type).

Figure 9:
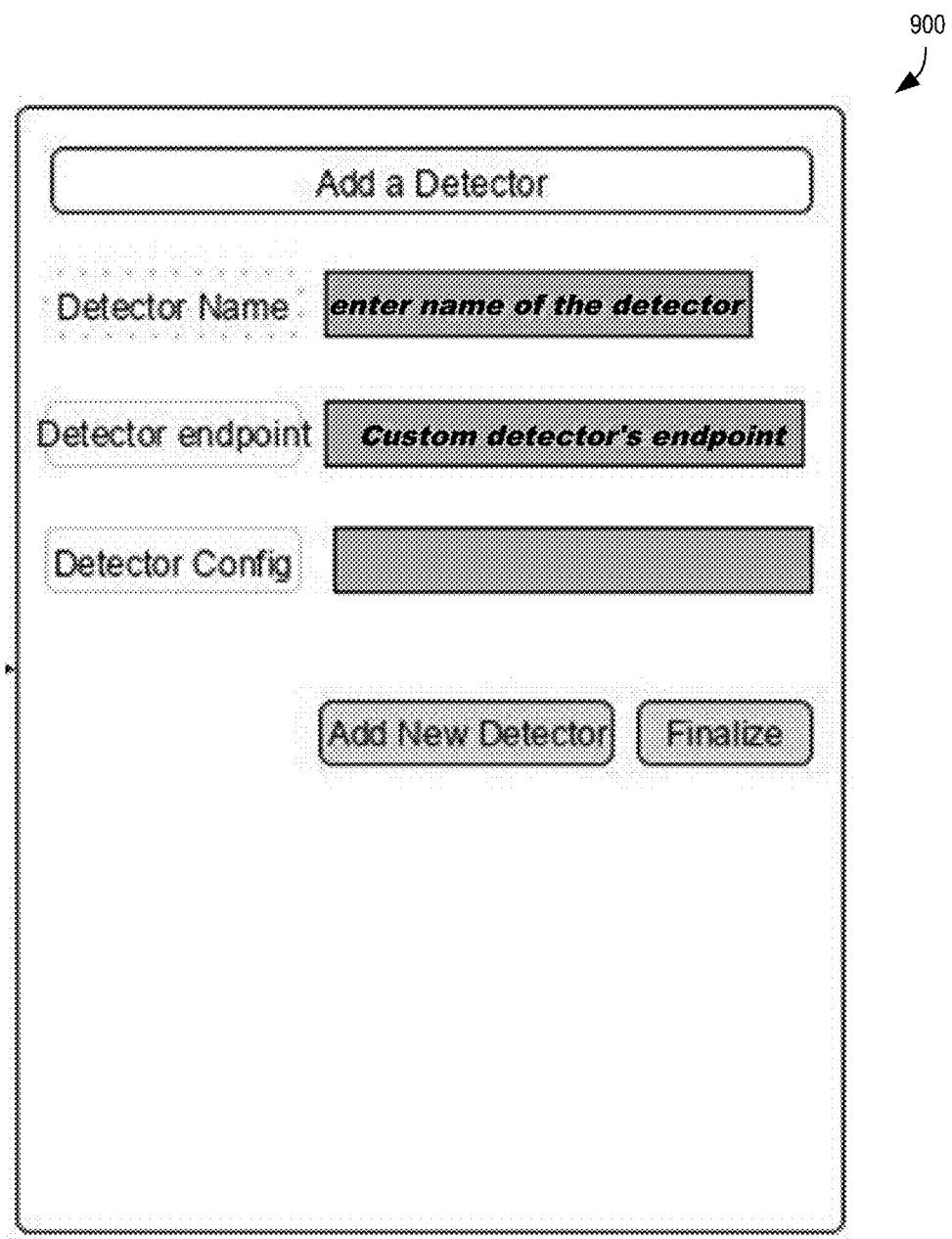
FIG. 9 is a diagram illustrating an exemplary graphical user interface for inputting a custom detector for a request to perform a review of source code according to some embodiments.

FIG. 9 is a diagram illustrating an exemplary graphical user interface 900 for inputting a custom detector for a request to perform a review of source code according to some embodiments. For example, selecting Add Custom Detectors and Next for graphical user interface 700 may cause display of graphical user interface 900. Depicted graphical user interface 900 includes a plurality of interface elements that allow a user to provide a detector name, detector endpoint, and detector configuration. This may be repeated for a second detector by selecting Add New Detector.

Figure 10:
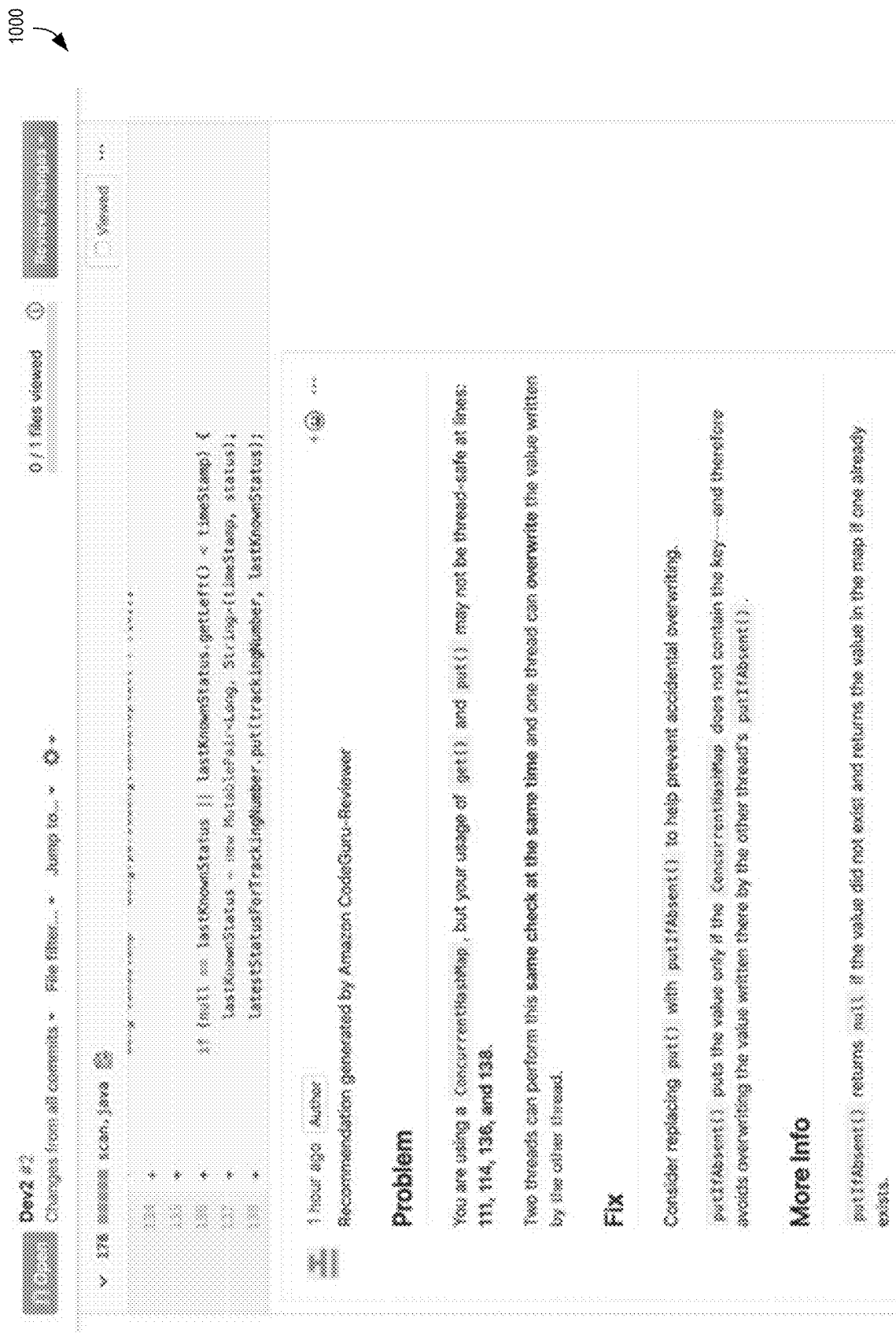
FIG. 10 is a diagram illustrating an exemplary graphical user interface of a recommendation published to a code repository for a request to perform a review of source code in the code repository according to some embodiments.

FIG. 10 is a diagram illustrating an exemplary graphical user interface 1000 of a recommendation published to a code repository for a request to perform a review of source code in the code repository according to some embodiments. Depicted published recommendation identifies a predicted issue (e.g., Problem) along with the recommendation (e.g., Fix).

Figure 11:
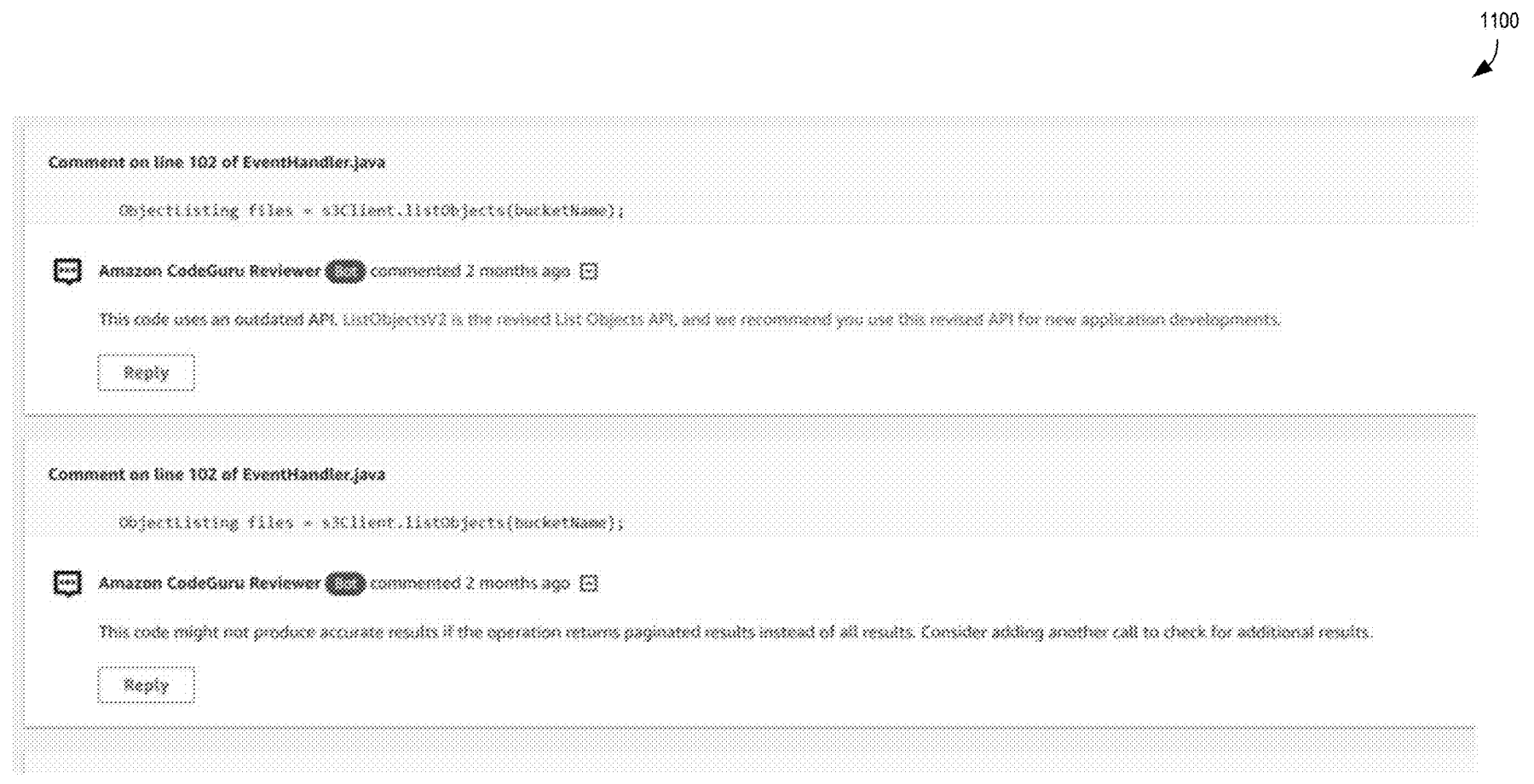

FIG. 11 is a diagram illustrating an exemplary graphical user interface 1100 of recommendations sent to a user for a request to perform a review of source code in the code repository according to some embodiments. Depicted recommendations identify predicted issues along with the corresponding recommendation. The recommendation for the upper predicted issue includes a link (e.g., to select the URL) to the solution, e.g., a revised API. The recommendation for the lower predicted issue includes text describing a possible solution, e.g., to add another call to check for additional results.

FIG. 12 is a diagram illustrating an exemplary control flow and data graph 1200 according to some embodiments. Depicted control flow and data graph 1200 is for the code at the top of the figure and represents the code at statement and expression levels that captures both the control flow and data flow between program elements. As discussed above, graph 1200 (e.g., data representing the graph 1200) is used in certain embodiments herein as an input to determine one or more predicted issues for the code by code reviewer service 112.

FIG. 13 is a diagram illustrating another exemplary control flow and data graph according to some embodiments. Depicted control flow and data graph 1300 is for the code at the top of the figure and represents the code at statement and expression levels that captures both the control flow and data flow between program elements. As discussed above, graph 1300 (e.g., data representing the graph 1200) is used in certain embodiments herein as an input to determine one or more predicted issues for the code by code reviewer service 112.

Figure 14:
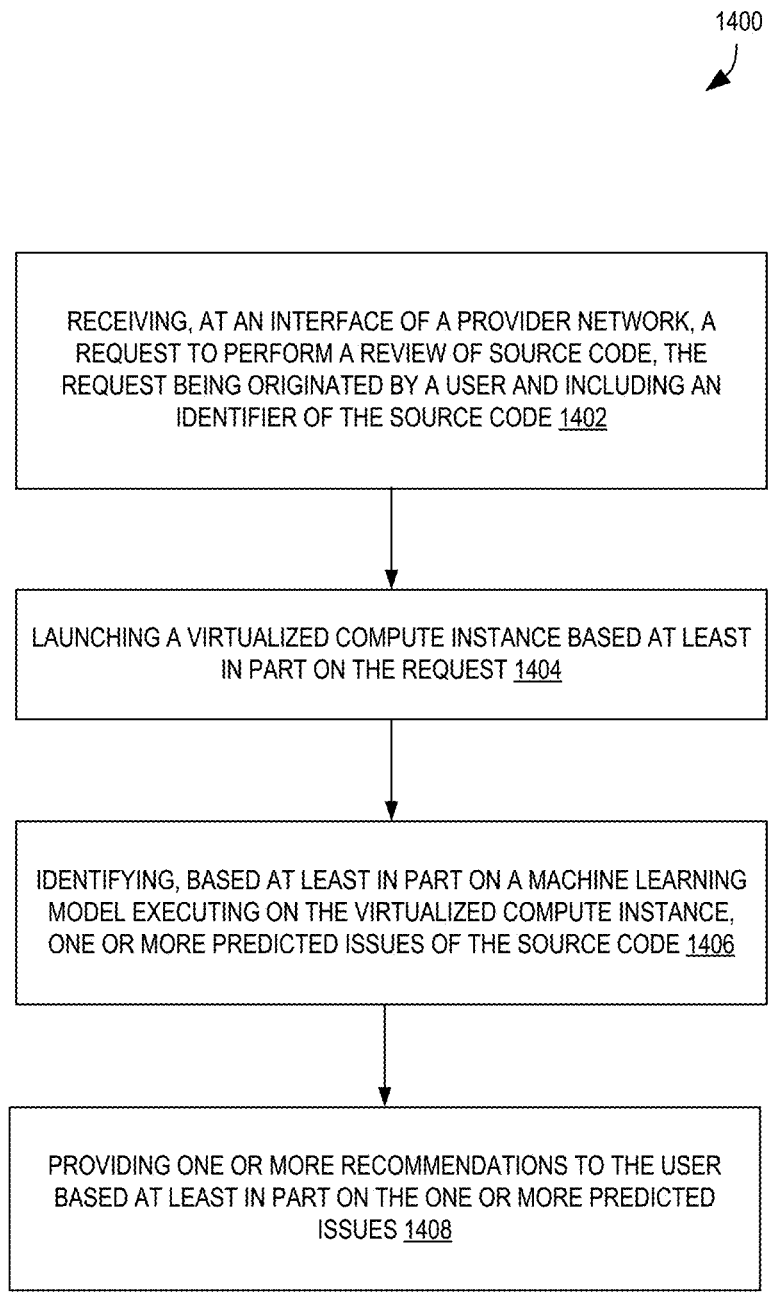
FIG. 14 is a flow diagram illustrating operations of a method for a code review service according to some embodiments.

FIG. 14 is a flow diagram illustrating operations of a method for a code review service according to some embodiments. Some or all of the operations 1400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1400 are performed by code reviewer service 112 of the other figures.

The operations 1400 include, at block 1402, receiving, at an interface of a provider network, a request to perform a review of source code, the request being originated by a user and including an identifier of the source code.

The operations 1400 further include, at block 1404, launching a virtualized compute instance based at least in part on the request.

The operations 1400 further include, at block 1406, identifying, based at least in part on a machine learning model executing on the virtualized compute instance, one or more predicted issues of the source code.

The operations 1400 further include, at block 1408, providing one or more recommendations to the user based at least in part on the one or more predicted issues.

In certain embodiments, code reviewer is to generate recommendations on the customer's code repositories in a secure way by running its recommendation service in a sandboxed and access-restricted environment, generate actionable recommendations reliably and durably on customer's code regardless of the size of their repository, not have any impact on customer's code repositories and run seamlessly to provide code recommendations, not store any customer's code repositories or even code snippets, and/or scale to run inference on all pull requests on onboarded repositories and to support multiple code repository providers (e.g., separate from provide network 100.

Figure 15:
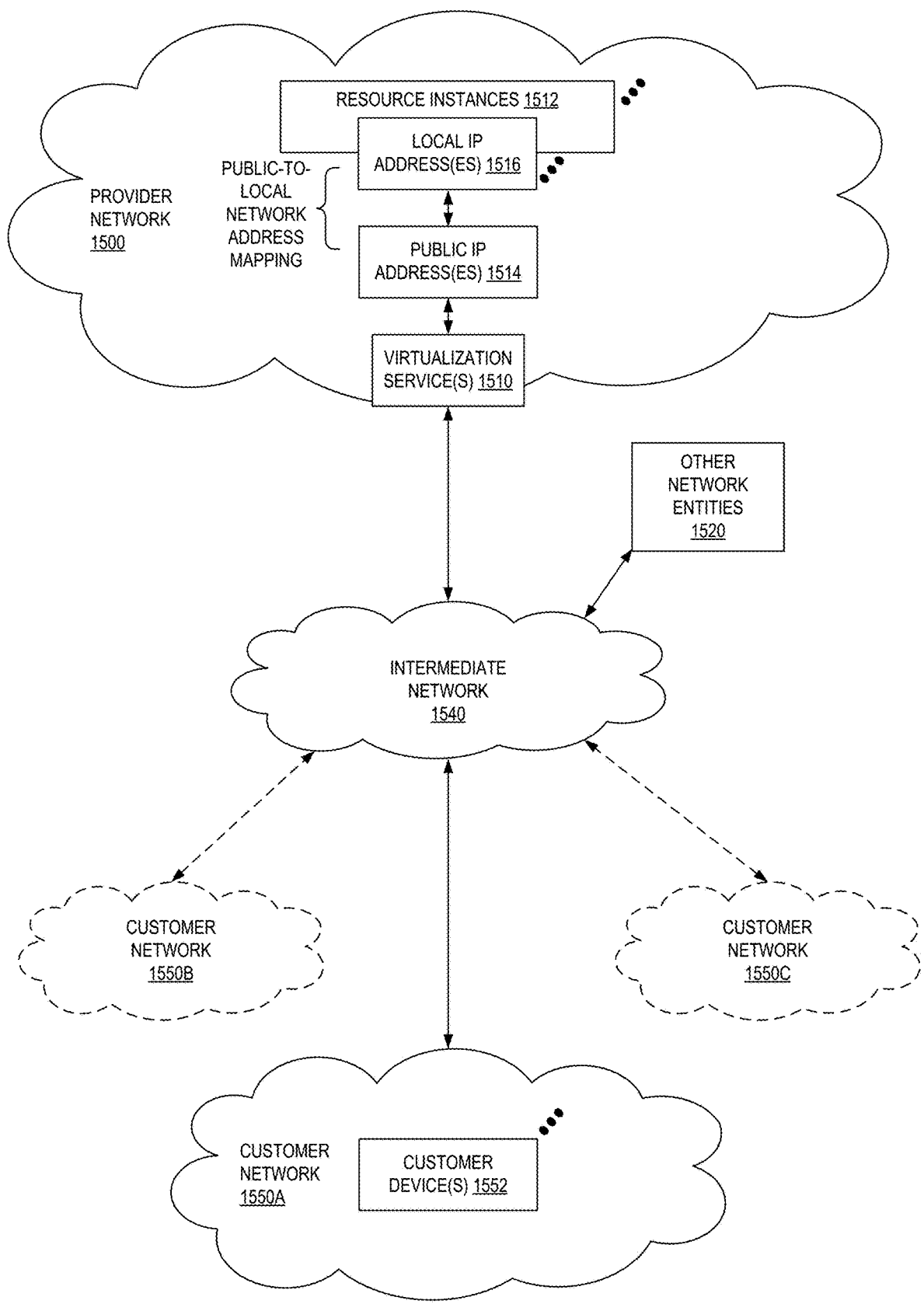
FIG. 15 illustrates an example provider network environment according to some embodiments.

FIG. 15 illustrates an example provider network (or "service provider system") environment according to some embodiments. A provider network 1500 may provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local Internet Protocol (IP) addresses 1516 may be associated with the resource instances 1512; the local IP addresses are the internal network addresses of the resource instances 1512 on the provider network 1500. In some embodiments, the provider network 1500 may also provide public IP addresses 1514 and/or public IP address ranges (e.g., Internet Protocol version 4 (IPv4) or Internet Protocol version 6 (IPv6) addresses) that customers may obtain from the provider 1500.

Conventionally, the provider network 1500, via the virtualization services 1510, may allow a customer of the service provider (e.g., a customer that operates one or more client networks 1550A-1550C including one or more customer device(s) 1552) to dynamically associate at least some public IP addresses 1514 assigned or allocated to the customer with particular resource instances 1512 assigned to the customer. The provider network 1500 may also allow the customer to remap a public IP address 1514, previously mapped to one virtualized computing resource instance 1512 allocated to the customer, to another virtualized computing resource instance 1512 that is also allocated to the customer. Using the virtualized computing resource instances 1512 and public IP addresses 1514 provided by the service provider, a customer of the service provider such as the operator of customer network(s) 1550A-1550C may, for example, implement customer-specific applications and present the customer's applications on an intermediate network 1540, such as the Internet. Other network entities 1520 on the intermediate network 1540 may then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 may be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1500; a customer may then assign their allocated public IP addresses to particular resource instances allocated to the customer. These public IP addresses may be referred to as customer public IP addresses, or simply customer IP addresses. Instead of being assigned by the provider network 1500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 16:
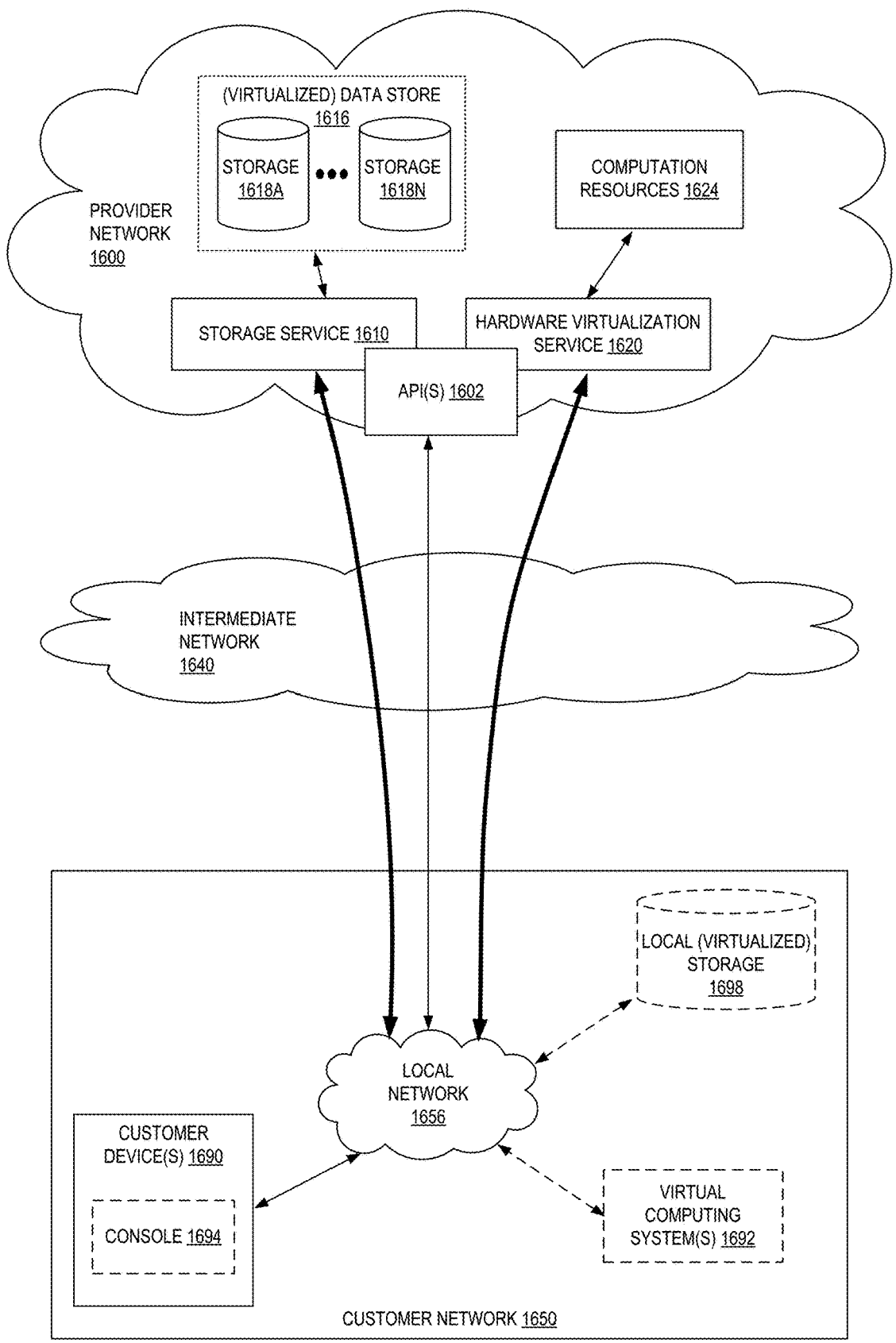
FIG. 16 is a block diagram of an example provider network that provides a storage service and a hardware virtualization service to customers according to some embodiments.

FIG. 16 is a block diagram of an example provider network that provides a storage service and a hardware virtualization service to customers, according to some embodiments. Hardware virtualization service 1620 provides multiple computation resources 1624 (e.g., VMs) to customers. The computation resources 1624 may, for example, be rented or leased to customers of the provider network 1600 (e.g., to a customer that implements customer network 1650). Each computation resource 1624 may be provided with one or more local IP addresses. Provider network 1600 may be configured to route packets from the local IP addresses of the computation resources 1624 to public Internet destinations, and from public Internet sources to the local IP addresses of computation resources 1624.

Provider network 1600 may provide a customer network 1650, for example coupled to intermediate network 1640 via local network 1656, the ability to implement virtual computing systems 1692 via hardware virtualization service 1620 coupled to intermediate network 1640 and to provider network 1600. In some embodiments, hardware virtualization service 1620 may provide one or more APIs 1602, for example a web services interface, via which a customer network 1650 may access functionality provided by the hardware virtualization service 1620, for example via a console 1694 (e.g., a web-based application, standalone application, mobile application, etc.). In some embodiments, at the provider network 1600, each virtual computing system 1692 at customer network 1650 may correspond to a computation resource 1624 that is leased, rented, or otherwise provided to customer network 1650.

From an instance of a virtual computing system 1692 and/or another customer device 1690 (e.g., via console 1694), the customer may access the functionality of storage service 1610, for example via one or more APIs 1602, to access data from and store data to storage resources 1618A-1618N of a virtual data store 1616 (e.g., a folder or "bucket", a virtualized volume, a database, etc.) provided by the provider network 1600. In some embodiments, a virtualized data store gateway (not shown) may be provided at the customer network 1650 that may locally cache at least some data, for example frequently-accessed or critical data, and that may communicate with storage service 1610 via one or more communications channels to upload new or modified data from a local cache so that the primary store of data (virtualized data store 1616) is maintained. In some embodiments, a user, via a virtual computing system 1692 and/or on another customer device 1690, may mount and access virtual data store 1616 volumes via storage service 1610 acting as a storage virtualization service, and these volumes may appear to the user as local (virtualized) storage 1698.

While not shown in FIG. 16, the virtualization service(s) may also be accessed from resource instances within the provider network 1600 via API(s) 1602. For example, a customer, appliance service provider, or other entity may access a virtualization service from within a respective virtual network on the provider network 1600 via an API 1602 to request allocation of one or more resource instances within the virtual network or within another virtual network.

Illustrative Systems

Figure 17:
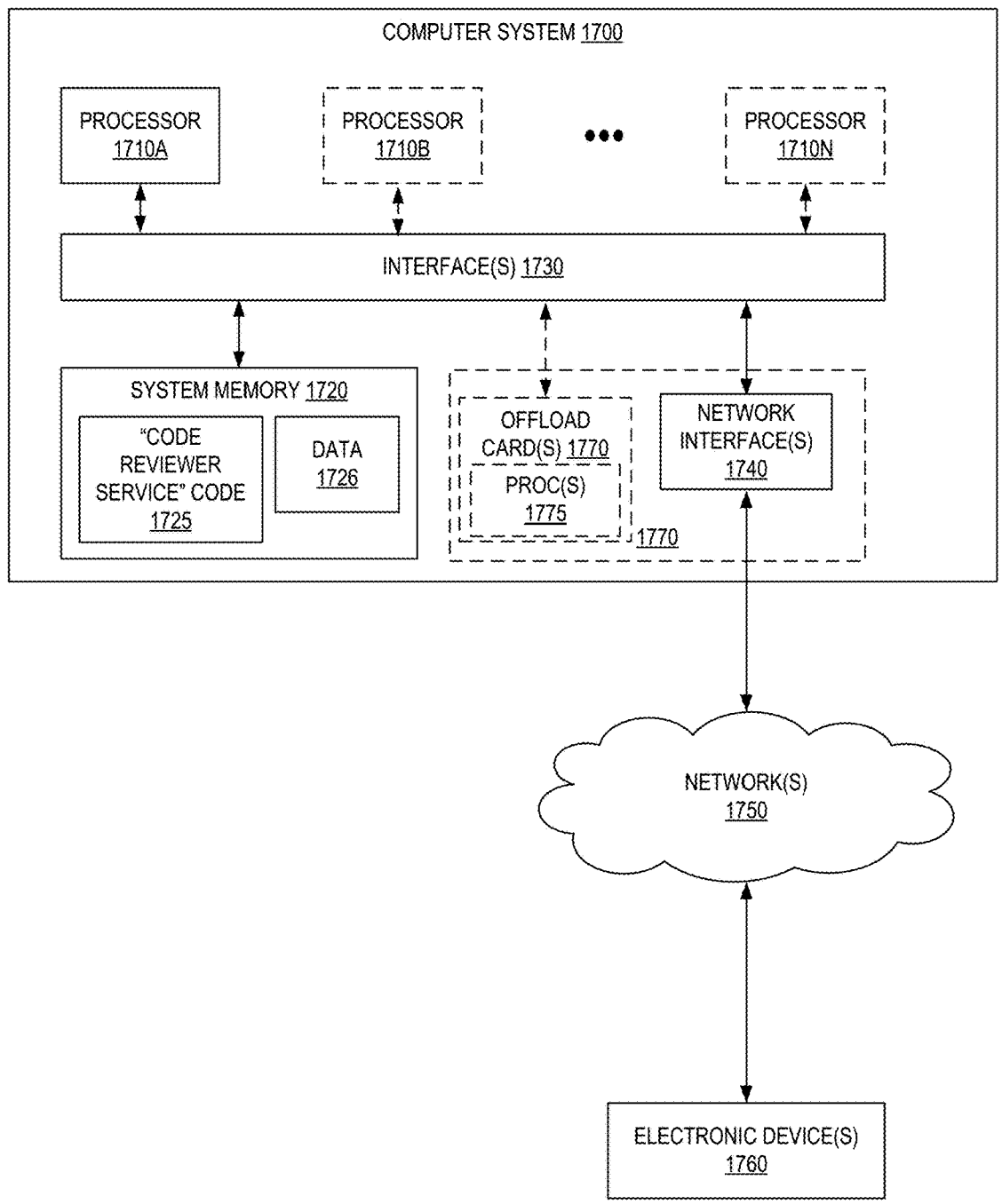
FIG. 17 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1700 illustrated in FIG. 17. In the illustrated embodiment, computer system 1700 includes one or more processors 1710 coupled to a system memory 1720 via an input/output (I/O) interface 1730. Computer system 1700 further includes a network interface 1740 coupled to I/O interface 1730. While FIG. 17 shows computer system 1700 as a single computing device, in various embodiments a computer system 1700 may include one computing device or any number of computing devices configured to work together as a single computer system 1700.

In various embodiments, computer system 1700 may be a uniprocessor system including one processor 1710, or a multiprocessor system including several processors 1710 (e.g., two, four, eight, or another suitable number). Processors 1710 may be any suitable processors capable of executing instructions. For example, in various embodiments, processors 1710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1710 may commonly, but not necessarily, implement the same ISA.

System memory 1720 may store instructions and data accessible by processor(s) 1710. In various embodiments, system memory 1720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1720 as "code reviewer service" code 1725 and data 1726.

In one embodiment, I/O interface 1730 may be configured to coordinate I/O traffic between processor 1710, system memory 1720, and any peripheral devices in the device, including network interface 1740 or other peripheral interfaces. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices 1760 attached to a network or networks 1750, such as other computer systems or devices as illustrated in FIG. 1, for example. In various embodiments, network interface 1740 may support communication via any suitable wired or wireless general data networks, such as types of Ethernet network, for example. Additionally, network interface 1740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1700 includes one or more offload cards 1770 (including one or more processors 1775, and possibly including the one or more network interfaces 1740) that are connected using an I/O interface 1730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1700 may act as a host electronic device (e.g., operating as part of a hardware virtualization service) that hosts compute instances, and the one or more offload cards 1770 execute a virtualization manager that can manage compute instances that execute on the host electronic device. As an example, in some embodiments the offload card(s) 1770 can perform compute instance management operations such as pausing and/or un-pausing compute instances, launching and/or terminating compute instances, performing memory transfer/copying operations, etc. These management operations may, in some embodiments, be performed by the offload card(s) 1770 in coordination with a hypervisor (e.g., upon a request from a hypervisor) that is executed by the other processors 1710A-1710N of the computer system 1700. However, in some embodiments the virtualization manager implemented by the offload card(s) 1770 can accommodate requests from other entities (e.g., from compute instances themselves), and may not coordinate with (or service) any separate hypervisor.

In some embodiments, system memory 1720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1700 via I/O interface 1730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1700 as system memory 1720 or another type of memory. Further, a computer-accessible medium may include transmission media or signals such as electrical, electromagnetic, or digital signals, conveyed via a communication medium such as a network and/or a wireless link, such as may be implemented via network interface 1740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1618A-1618N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at an interface of a provider network, a request to perform a review of source code, the request being originated by a user causing the provider network to monitor a pull request to a repository for the source code, and including an identifier of the source code;
   launching a virtualized compute instance based at least in part on the request;
   identifying, in response to detection of the pull request and based at least in part on a machine learning model executing on one or more processors of the virtualized compute instance and one or more rules executing on one or more processors of the virtualized compute instance, one or more predicted issues of the source code; and
   providing one or more recommendations to the user based at least in part on the one or more predicted issues, wherein the providing of the one or more recommendations comprises posting the one or more recommendations on the pull request.

2. The computer-implemented method of claim 1, wherein the one or more rules comprises a user-defined rule.

3. A computer-implemented method comprising:
   receiving, at an interface of a provider network, a request to perform a review of source code, the request including an identifier of the source code and causing a webhook service of the provider network to monitor a pull request to a repository for the source code;
   launching a job instance based at least in part on the request;
   identifying, in response to detection of the pull request and based at least in part on a machine learning model executing on one or more processors of the provider network for the job instance and one or more rules executing on one or more processors of the provider network for the job instance, one or more predicted issues of the source code; and providing one or more recommendations based at least in part on the one or more predicted issues, wherein the providing of the one or more recommendations comprises posting the one or more recommendations on the pull request.

4. The computer-implemented method of claim 3, wherein the one or more rules comprises a user-defined rule.

5. The computer-implemented method of claim 3, wherein the one or more recommendations are deleted from the provider network in response to the posting.

6. The computer-implemented method of claim 3, wherein the request causes a request monitoring service of the provider network to monitor the pull request for the source code from a user.

7. The computer-implemented method of claim 6, wherein the providing of the one or more recommendations comprises sending the one or more recommendations to the user.

8. The computer-implemented method of claim 3, wherein the one or more recommendations are deleted from the provider network after a threshold time to live has expired.

9. The computer-implemented method of claim 3, further comprising generating a control flow and data flow graph from the source code, and wherein the identifying comprises identifying the one or more predicted issues from the control flow and data flow graph.

10. The computer-implemented method of claim 9, wherein the identifying further comprises applying the one or more rules to the control flow and data flow graph to identify the one or more predicted issues of the source code.

11. A system comprising:
a first one or more electronic devices to implement a front service in a multi-tenant provider network, the front end service including a first set of instructions that upon execution cause the front end service to perform a method comprising receiving, from an interface of the multi-tenant provider network, a request to perform a review of source code; and
a second one or more electronic devices to implement a code reviewer service in the multi-tenant provider network, the code reviewer service including a second set of instructions that upon execution cause the code reviewer service to perform a method comprising:

launching a job instance based at least in part on the request;
causing a webhook service of the multi-tenant provider network to monitor a pull request to a repository for the source code;
identifying, in response to detection of the pull request and based at least in part on a machine learning model executing on one or more processors of the multi-tenant provider network for the job instance and one or more rules executing on one or more processors of the multi-tenant provider network for the job instance, one or more predicted issues of the source code; and
providing one or more recommendations based at least in part on the one or more predicted issues, wherein the providing of the one or more recommendations comprises posting the one or more recommendations on the pull request.

12. The system of claim 11, wherein the one or more rules comprises a user-defined rule.

13. The system of claim 11, wherein the request causes a request monitoring service of the multi-tenant provider network to monitor the pull request for the source code from a user.

14. The system of claim 13, wherein the providing of the one or more recommendations comprises sending the one or more recommendations to the user.

15. The system of claim 11, wherein the one or more recommendations are deleted from the multi-tenant provider network in response to the posting.

16. The system of claim 11, wherein the second set of instructions that upon execution cause the code reviewer service to perform the method further comprising deleting the one or more recommendations from the multi-tenant provider network after a threshold time to live has expired.

17. The system of claim 11, wherein the second set of instructions that upon execution cause the code reviewer service to perform the method further comprising generating a control flow and data flow graph from the source code, and wherein the identifying comprises identifying the one or more predicted issues from the control flow and data flow graph.

18. The system of claim 17, wherein the second set of instructions that upon execution cause the code reviewer service to perform the method wherein the identifying further comprises applying the one or more rules to the control flow and data flow graph to identify the one or more predicted issues of the source code.

* * * * *